(12) United States Patent
Bock

(10) Patent No.: US 9,222,535 B2
(45) Date of Patent: Dec. 29, 2015

(54) SPRING ELEMENT

(75) Inventor: Klaus Bock, Verl (DE)

(73) Assignee: Hermann Bock GmbH, Verl (DE)

( * ) Notice: Subject to any disclaimer, the term of this patent is extended or adjusted under 35 U.S.C. 154(b) by 0 days.

(21) Appl. No.: 13/884,730

(22) PCT Filed: Nov. 11, 2011

(86) PCT No.: PCT/DE2011/075269
§ 371 (c)(1),
(2), (4) Date: May 10, 2013

(87) PCT Pub. No.: WO2012/062313
PCT Pub. Date: May 18, 2012

(65) Prior Publication Data
US 2013/0228959 A1    Sep. 5, 2013

(30) Foreign Application Priority Data

Nov. 11, 2010    (DE) ..................... 20 2010 015 380 U

(51) Int. Cl.
*F16F 1/36*    (2006.01)
*F16F 3/087*    (2006.01)
(Continued)

(52) U.S. Cl.
CPC .................. *F16F 1/36* (2013.01); *A47C 23/002* (2013.01); *A47C 23/02* (2013.01); *A47C 27/065* (2013.01); *F16F 3/0876* (2013.01); *Y10T 403/54* (2015.01)

(58) Field of Classification Search
CPC ...... A47C 23/002; A47C 23/04; A47C 23/06; A47C 23/28; A47C 7/34
USPC ........... 267/80, 165, 158, 182, 160, 148, 149, 267/97, 151, 81, 43, 290, 7, 70, 142, 164, 267/133, 110, 103, 89, 105; 297/344.1; 5/255, 247, 719, 253, 261, 716
See application file for complete search history.

(56) References Cited

U.S. PATENT DOCUMENTS 122,111 A    12/1871    Duffy
6,170,808 B1    1/2001    Kutschi
(Continued)

FOREIGN PATENT DOCUMENTS

DE    2 015 659    10/1970
DE    37 08 594 A1    10/1987
(Continued)

*Primary Examiner* — Anna Momper
*Assistant Examiner* — San Aung
(74) *Attorney, Agent, or Firm* — Gudrun E. Huckett

(57) ABSTRACT

The invention relates to a spring element (1) for a cushioning device of a piece of furniture for sitting or lying, in particular for a bed mattress, comprising a spring body (10) and an accommodating section (30) arranged thereon, wherein the spring body (10) and the accommodating section (30) are injection-molded from plastic as one piece. In order to develop a spring element (1) of the type mentioned above in such a way that the spring element can be used for an extended range of applications, a spring element (1) is proposed that is characterized in that the spring body (10) is designed as a ring part (11) extended in the longitudinal direction (40), which ring part comprises two ring part sections (13, 14) that transition into each other as one piece in a center section (12), said ring part sections each having an upward slope in the height direction (42) starting from the center section (12), wherein the end areas (15, 16) of the ring part sections (13, 14) lying opposite each other in the longitudinal direction (40) are connected to each other, the accommodating section (30) lying therebetween.

11 Claims, 36 Drawing Sheets

(51) Int. Cl.
*A47C 23/00* (2006.01)
*A47C 27/06* (2006.01)
*A47C 23/02* (2006.01)

(56) References Cited

U.S. PATENT DOCUMENTS

| | | | |
|---|---|---|---|
| 6,446,945 B1* | 9/2002 | Wisniewski | 267/131 |
| 6,477,727 B1 | 11/2002 | Fromme | |
| 6,994,333 B2* | 2/2006 | Lobry et al. | 267/145 |
| 2002/0163114 A1* | 11/2002 | Lobry et al. | 267/142 |
| 2003/0127901 A1 | 7/2003 | Lovato | |
| 2004/0123384 A1* | 7/2004 | Fromme | 5/255 |
| 2008/0023895 A1* | 1/2008 | Fossati | 267/106 |
| 2009/0064536 A1* | 3/2009 | Klassen et al. | 36/27 |
| 2009/0133195 A1 | 5/2009 | Elzenbeck | |
| 2012/0025576 A1* | 2/2012 | Stern et al. | 297/344.1 |

FOREIGN PATENT DOCUMENTS

| | | |
|---|---|---|
| DE | 20 2006 002 748 U1 | 4/2006 |
| DE | 20 2009 006 802 U1 | 10/2010 |
| EP | 1 046 361 A1 | 10/2000 |
| EP | 1 153 558 A2 | 11/2001 |
| EP | 1 358 825 A1 | 11/2003 |
| EP | 1 602 303 A2 | 12/2005 |
| EP | 2 220 968 A1 | 8/2010 |
| EP | 2 289 372 A1 | 3/2011 |
| FR | 2 705 215 A1 | 11/1994 |
| FR | 2 736 251 A1 | 1/1997 |
| JP | 2001-510060 | 7/2001 |
| WO | 01/50923 A1 | 7/2001 |
| WO | 2005/048781 A2 | 6/2005 |
| WO | 2008/083732 A2 | 7/2008 |
| WO | 2010/113152 A1 | 10/2010 |

* cited by examiner

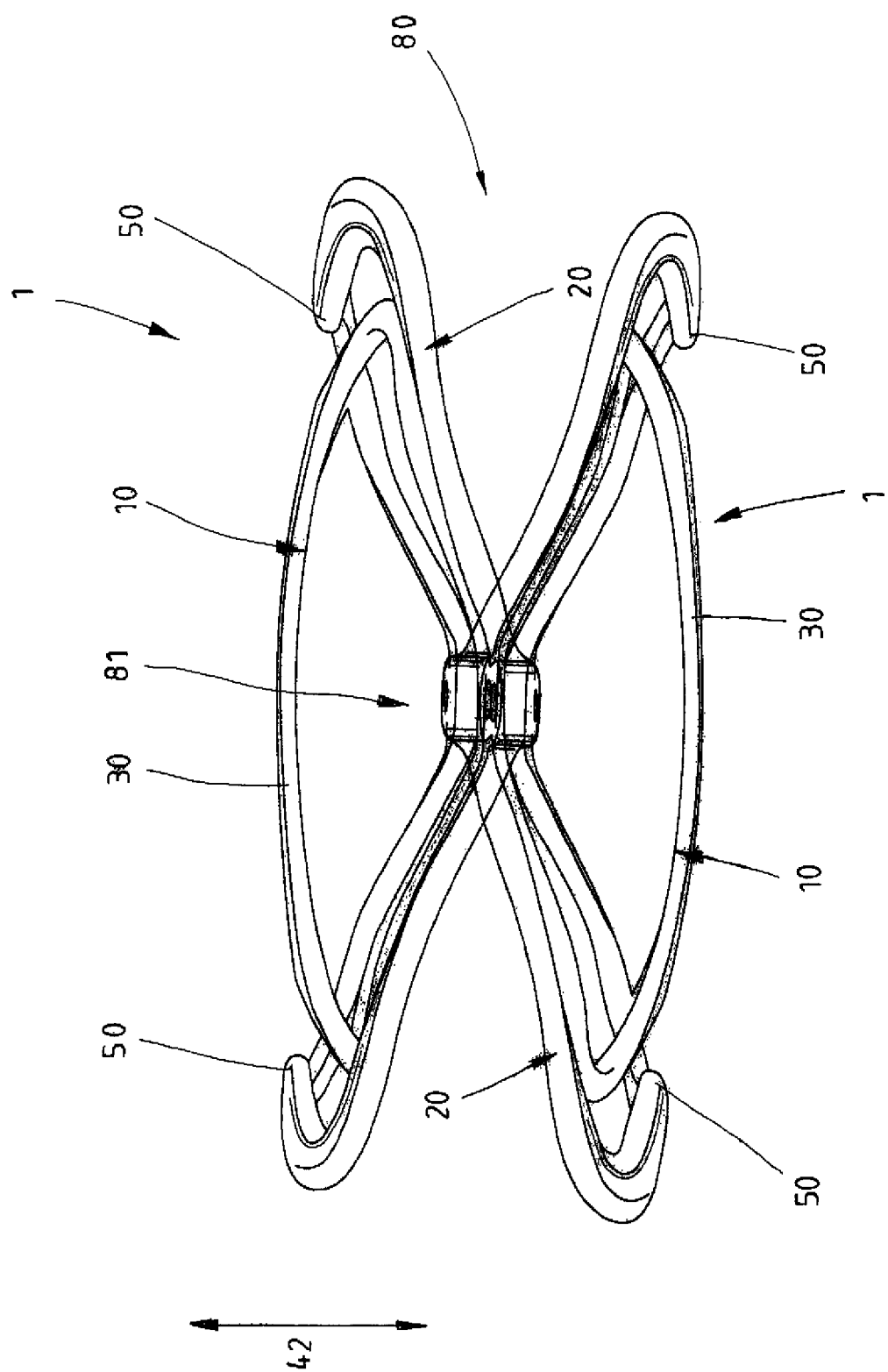

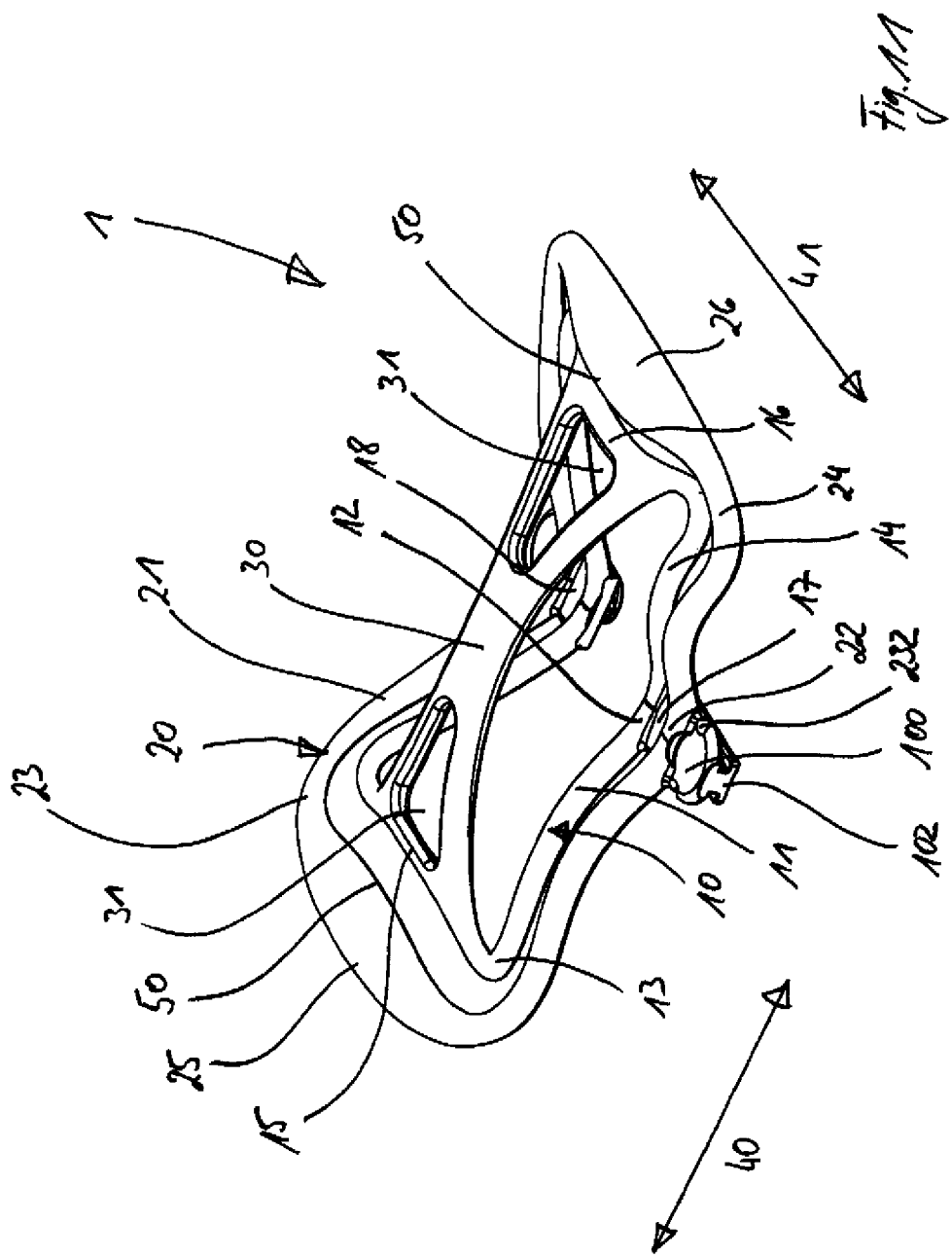

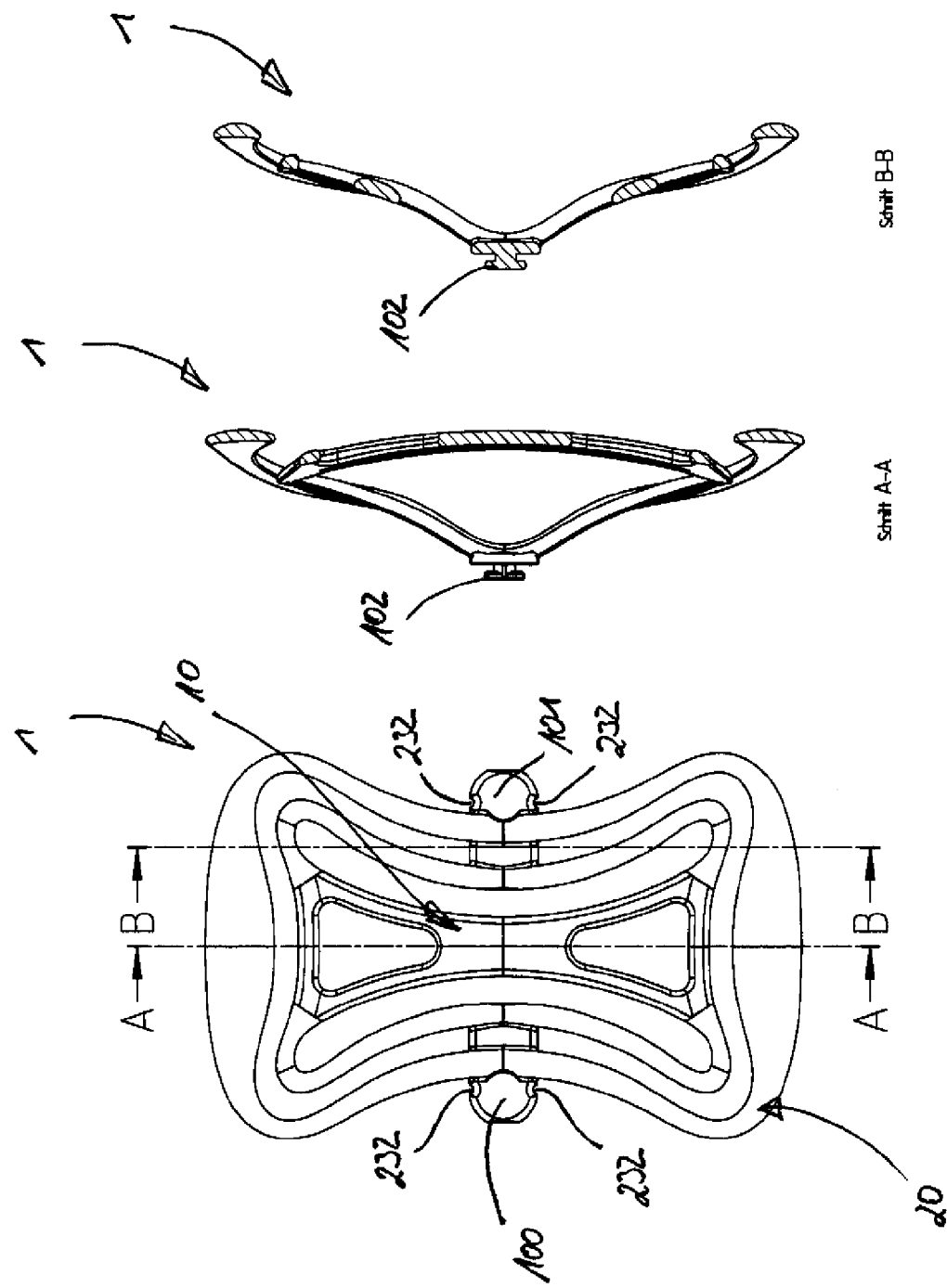

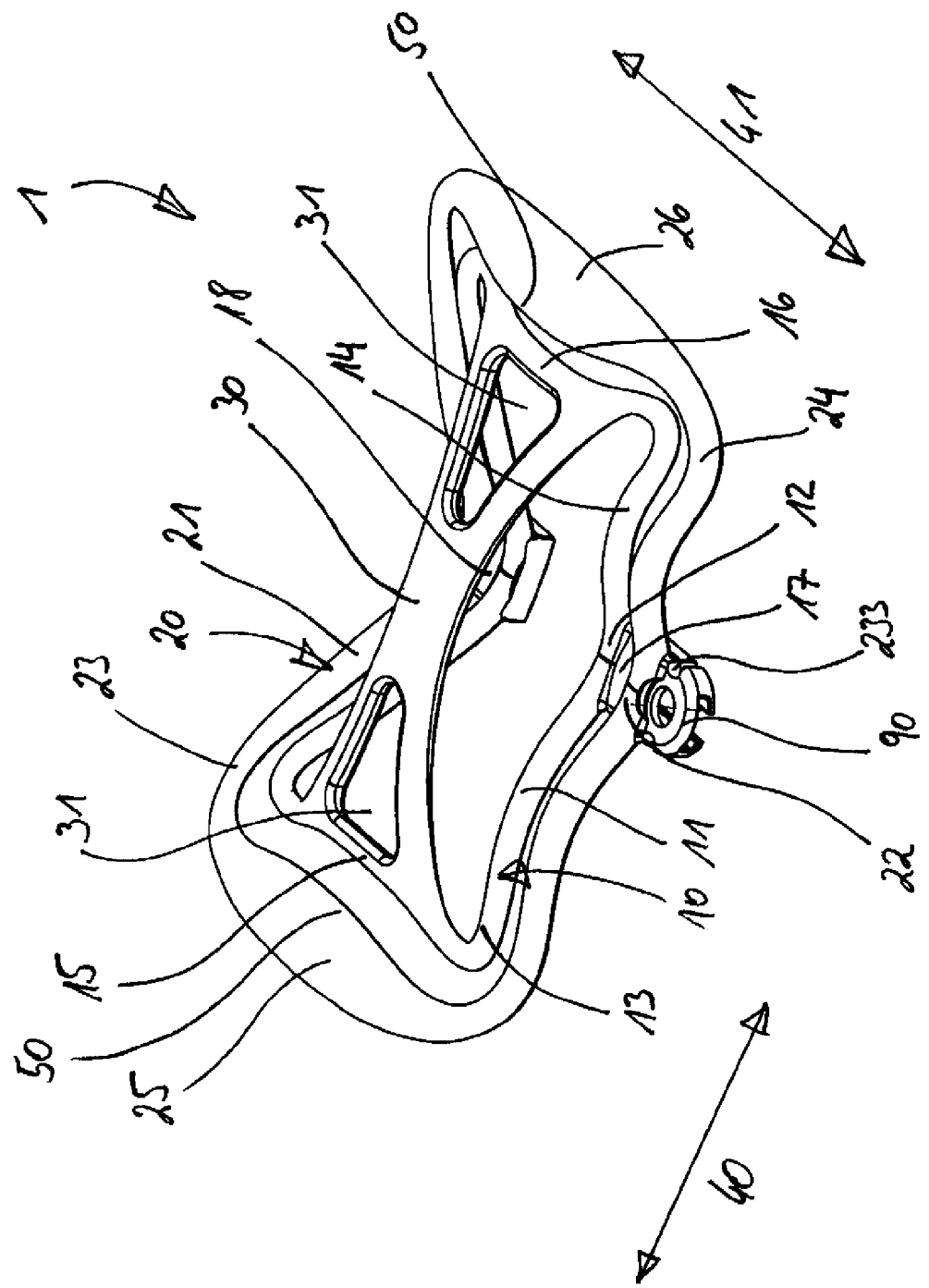

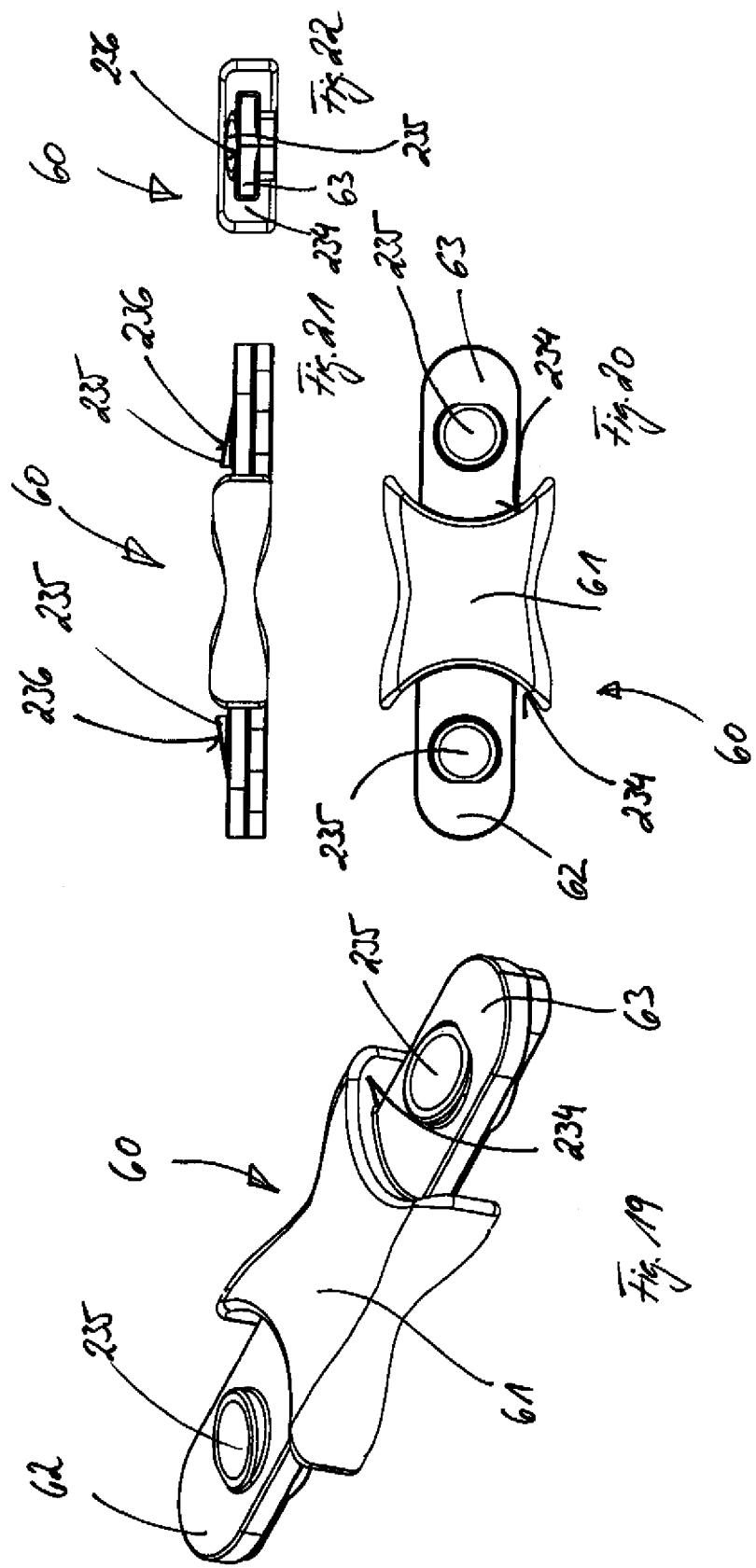

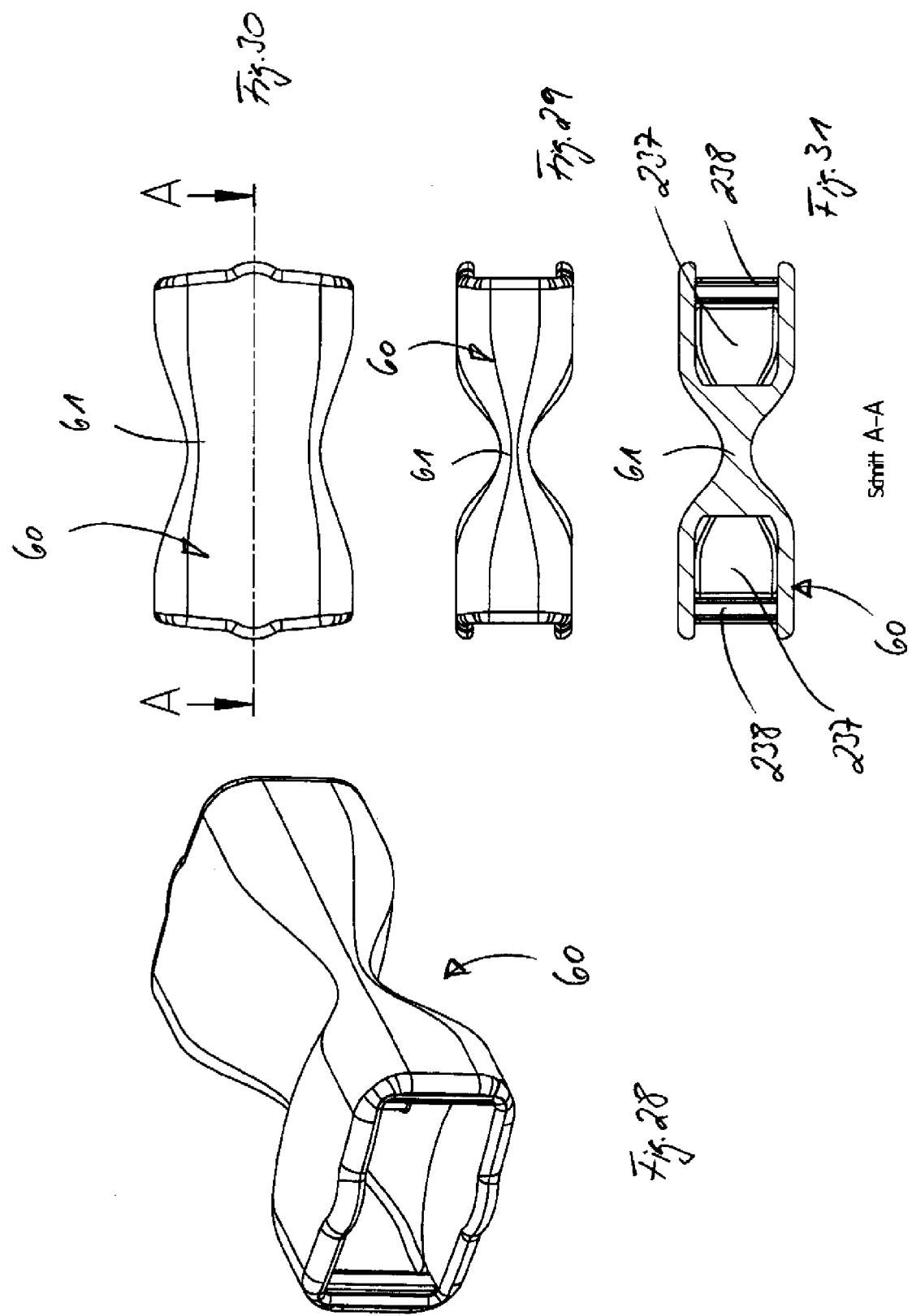

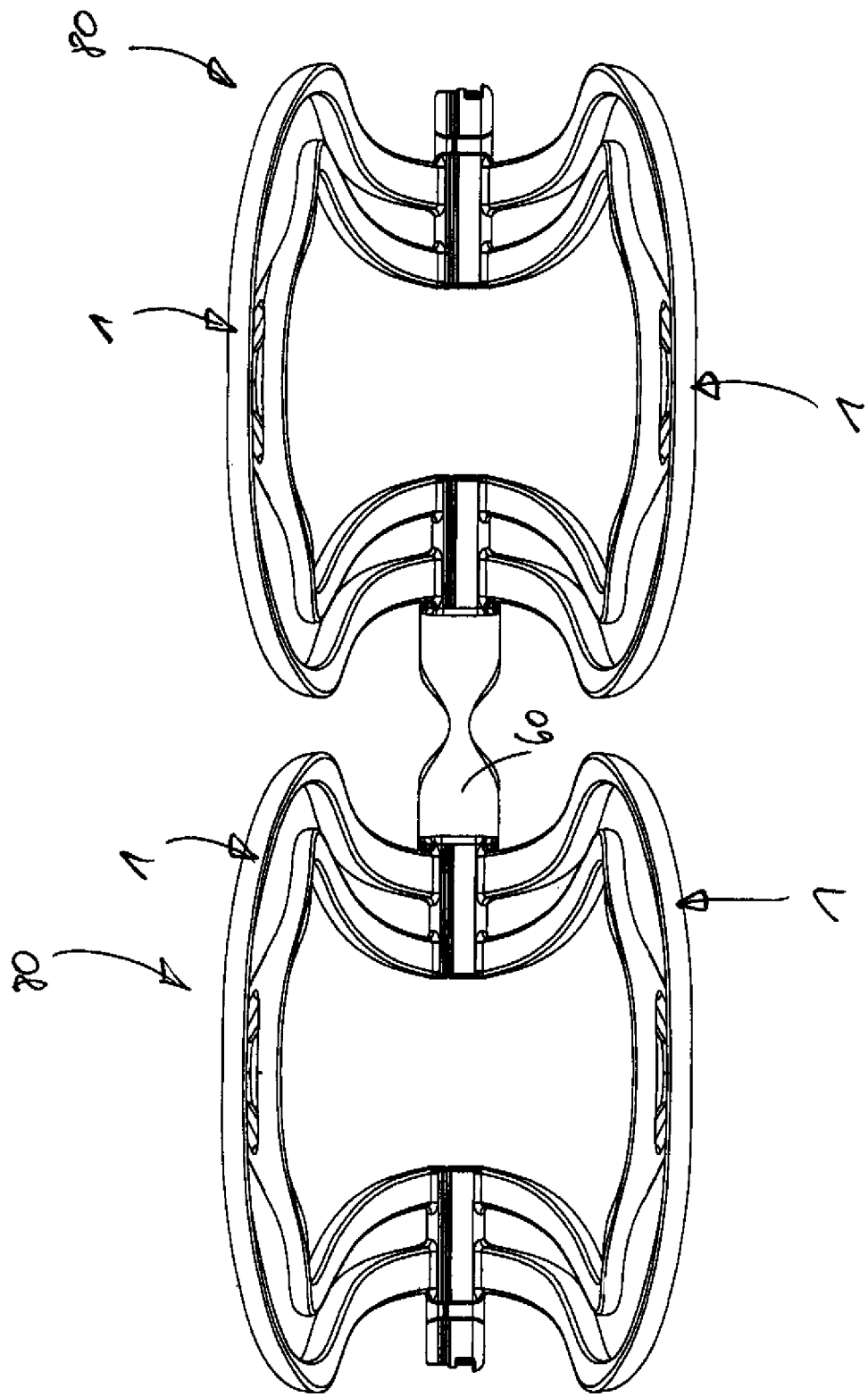

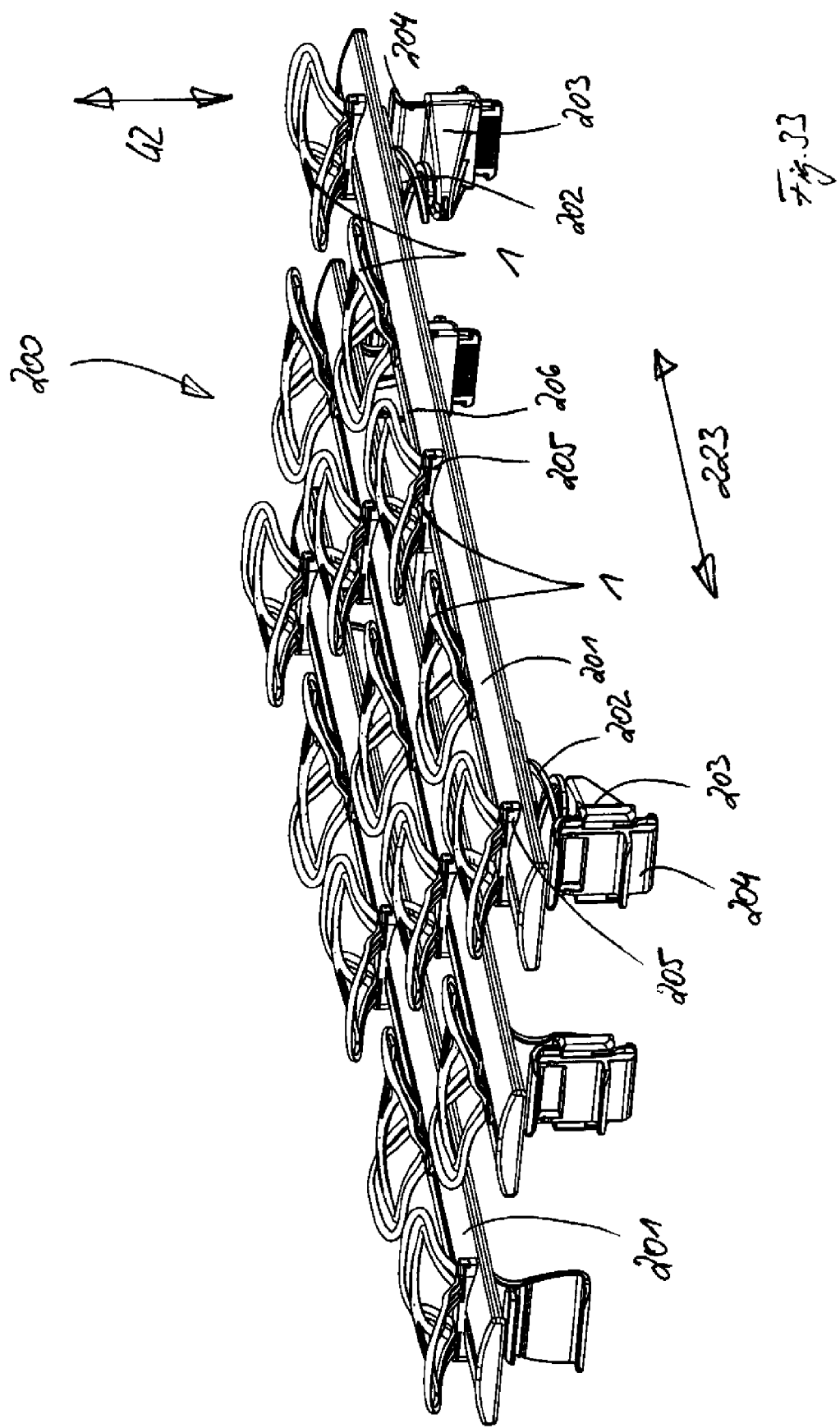

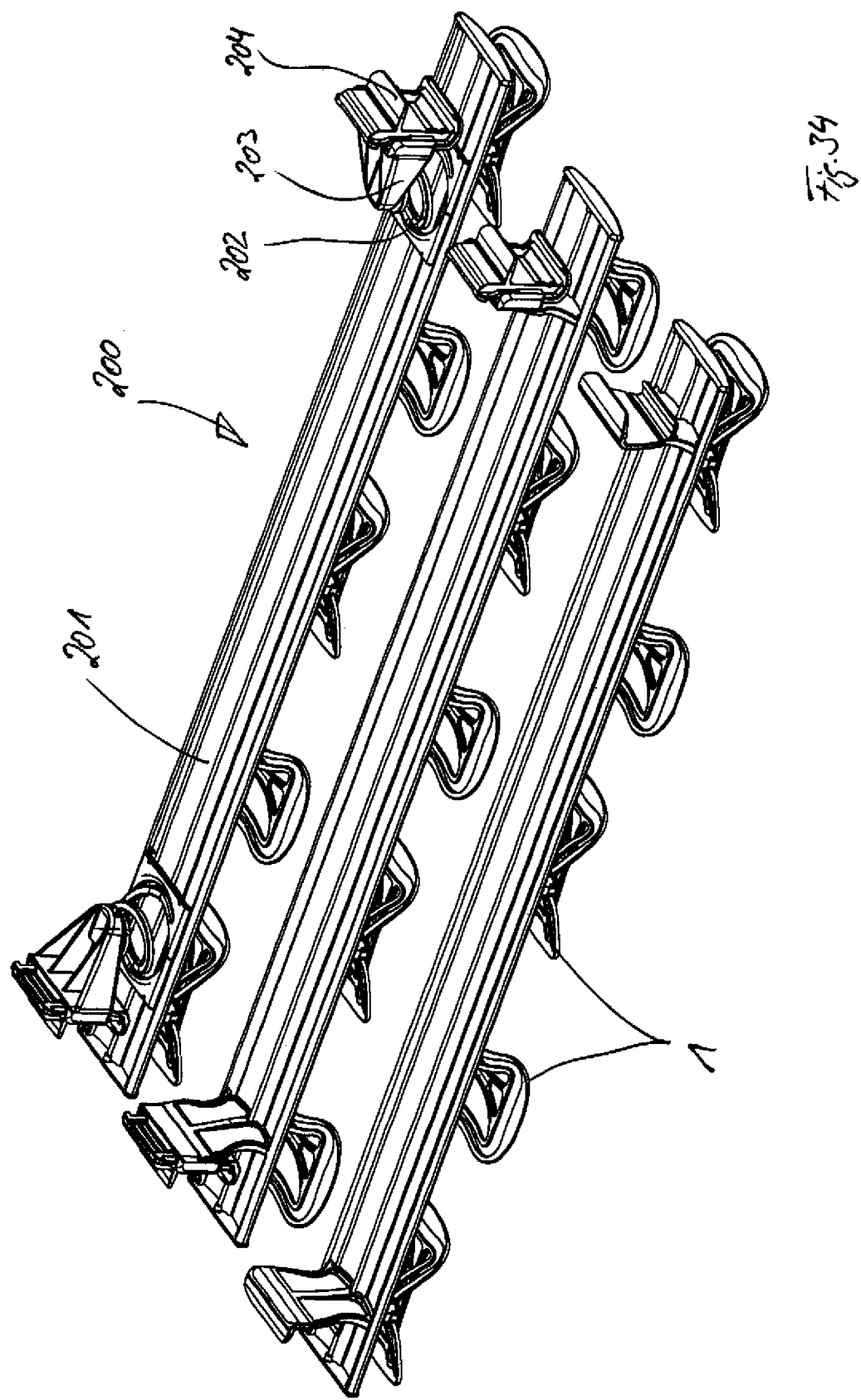

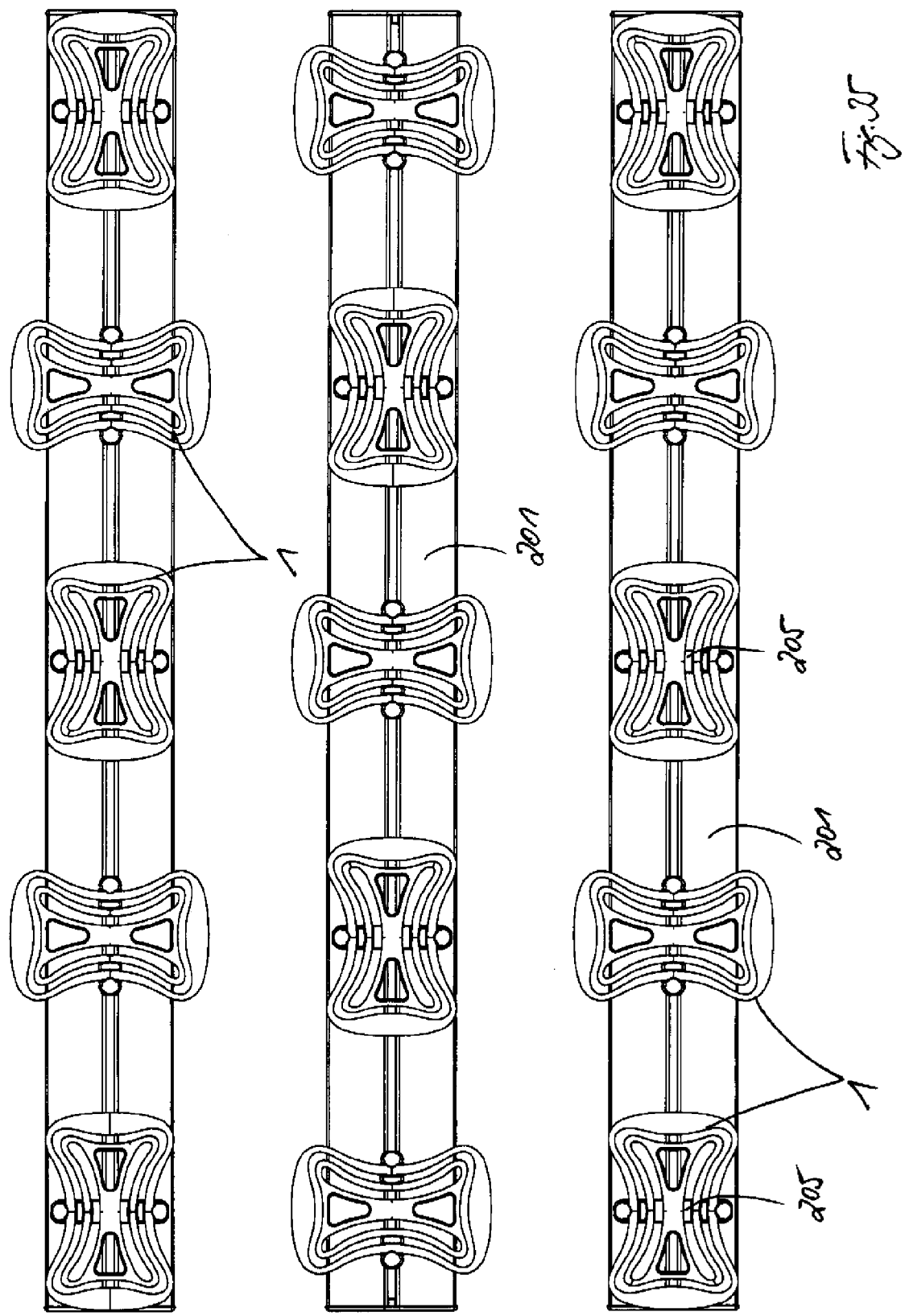

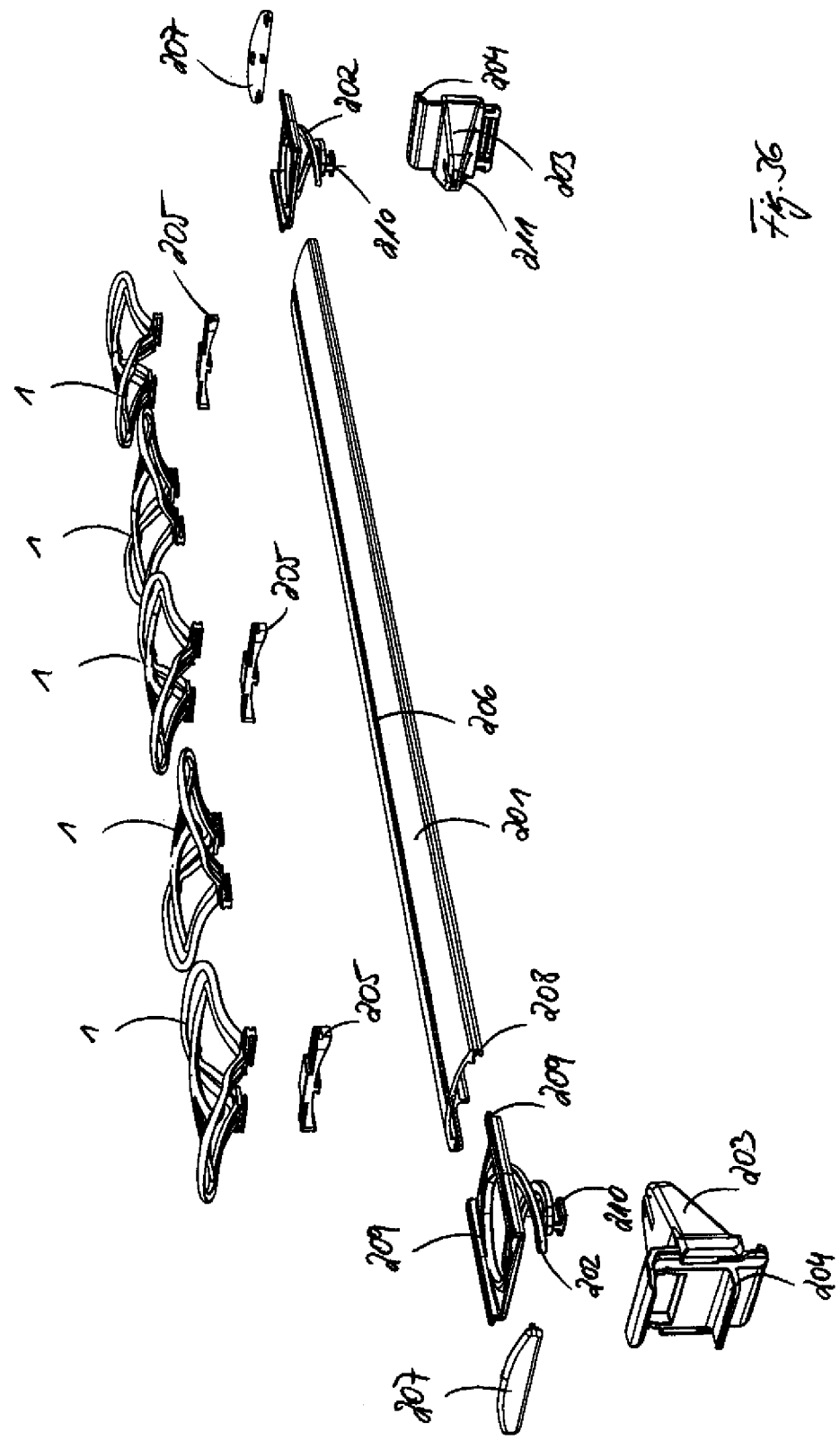

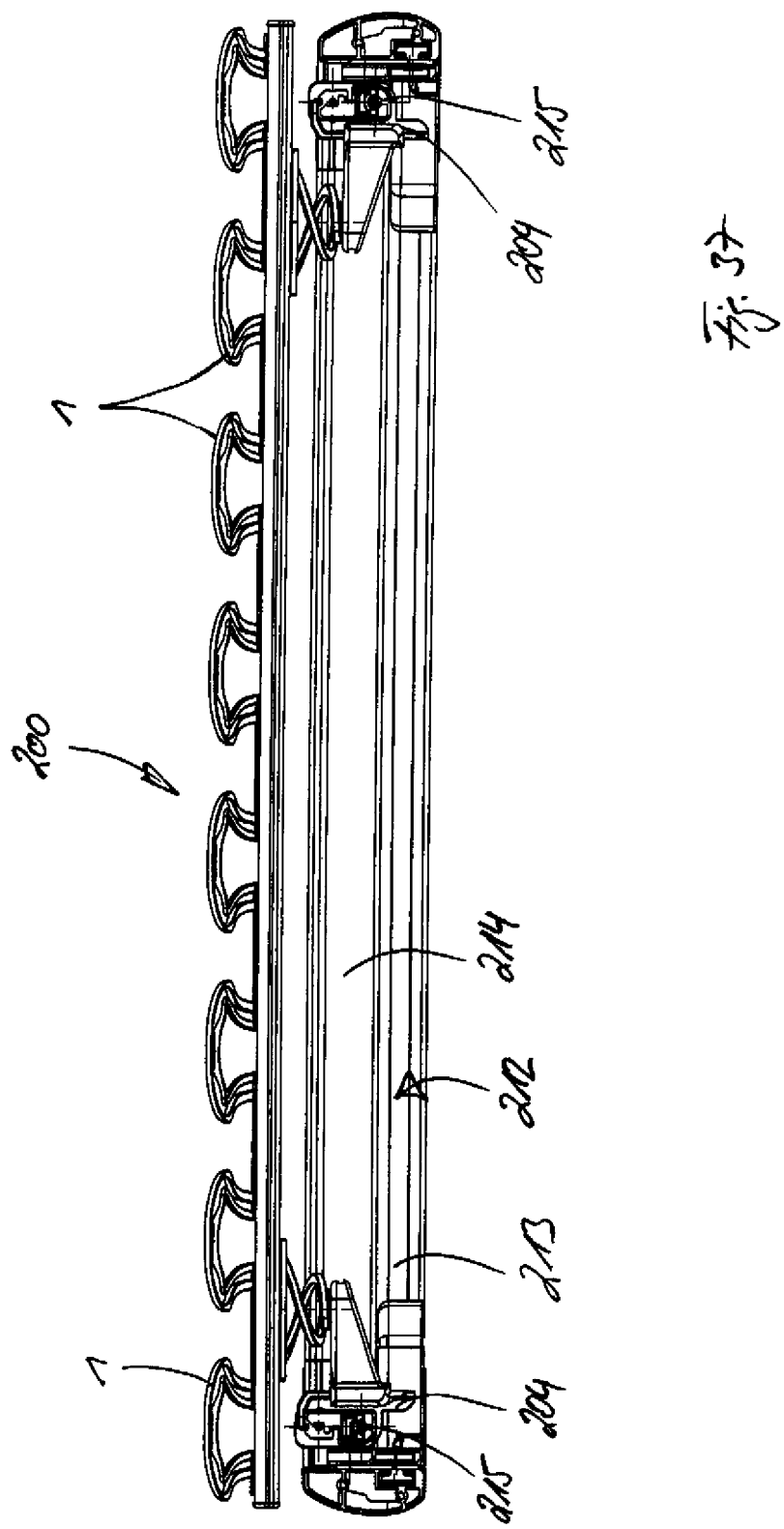

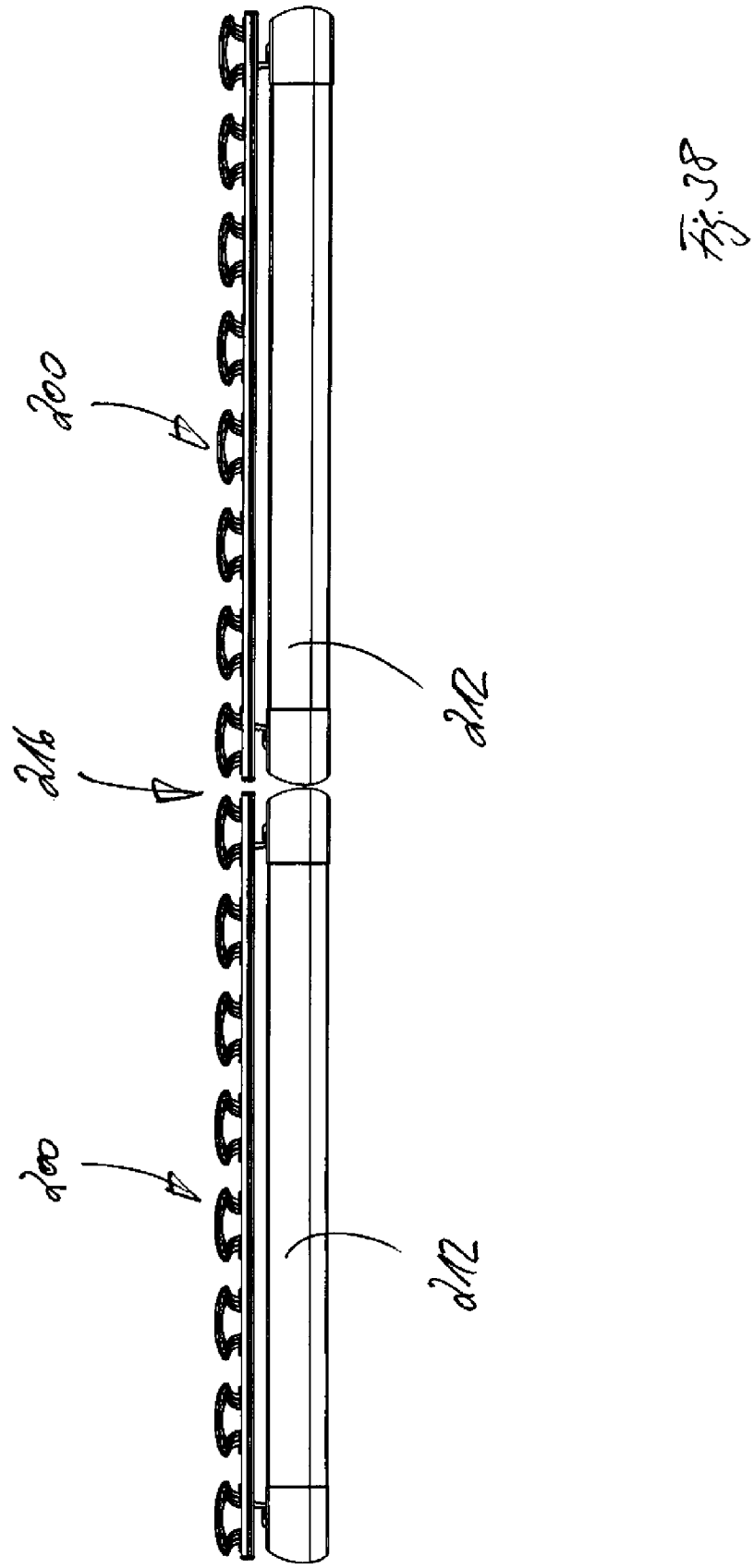

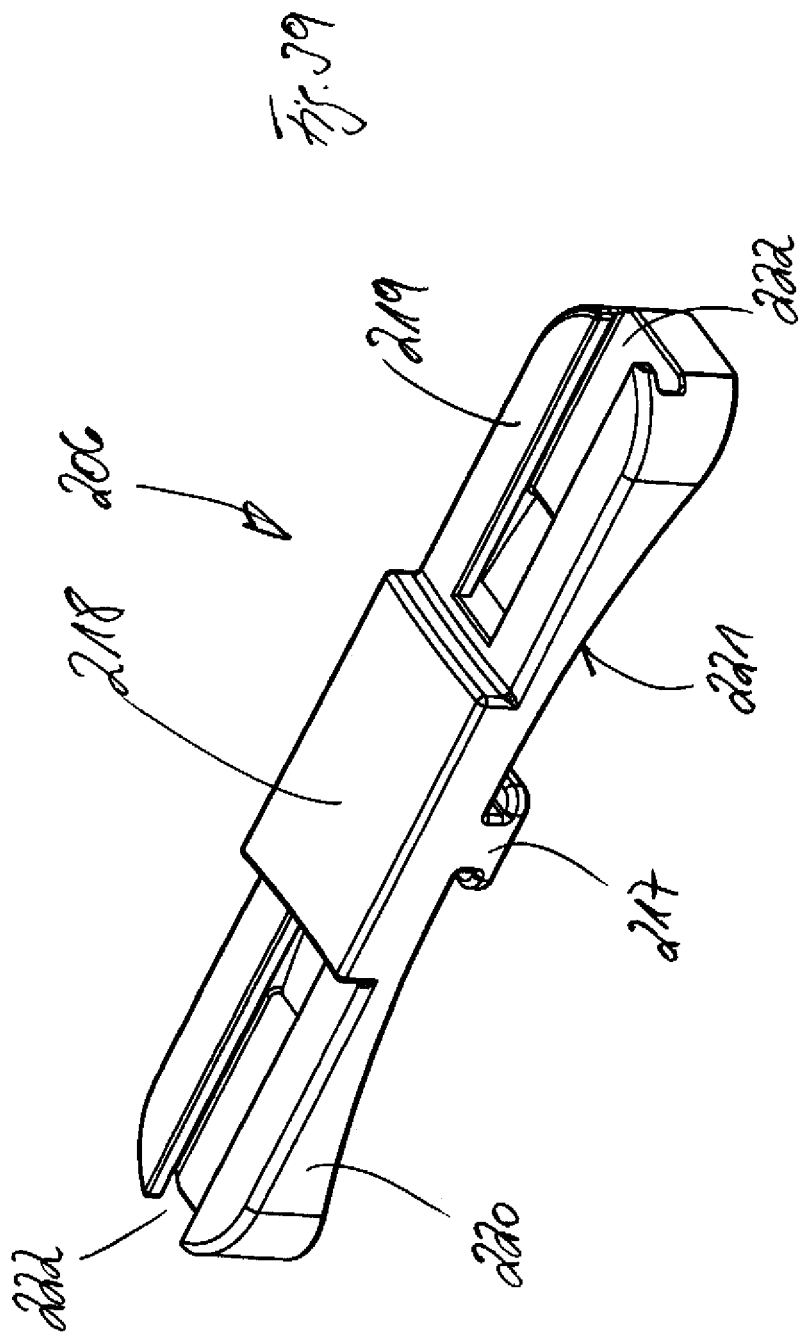

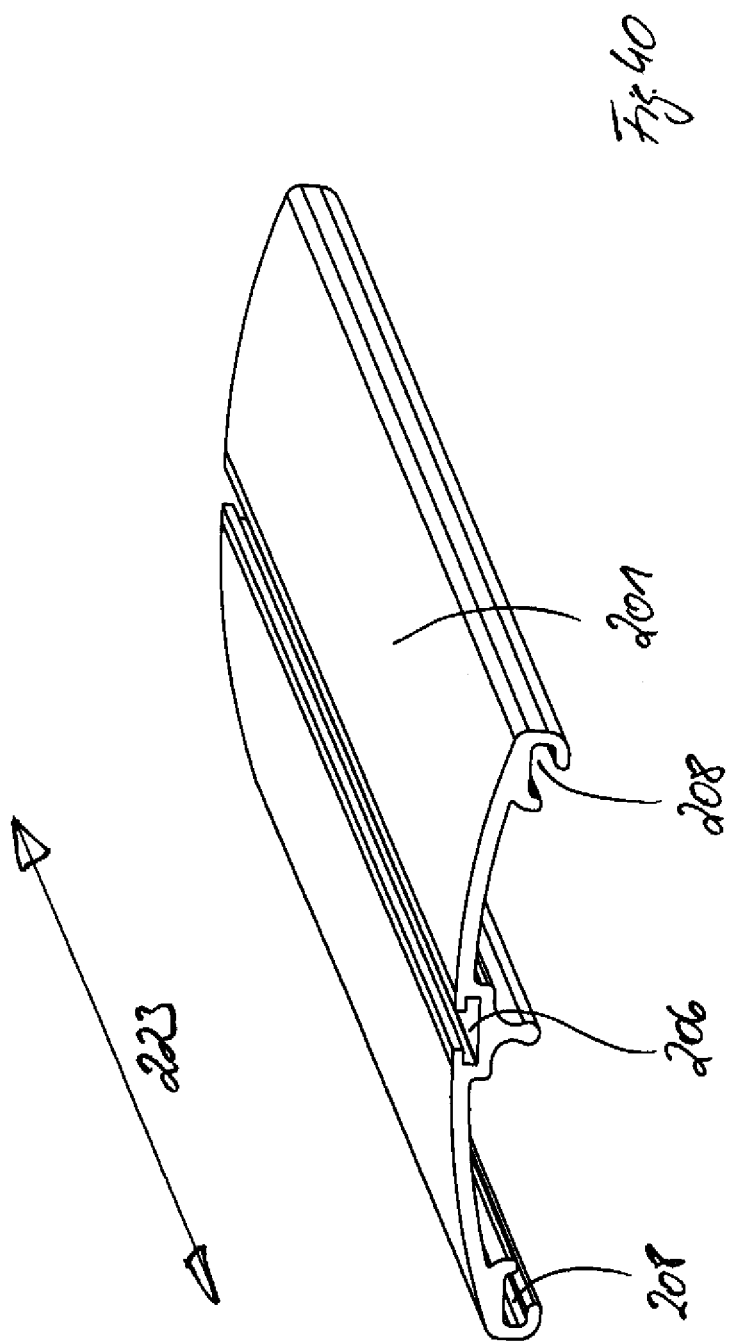

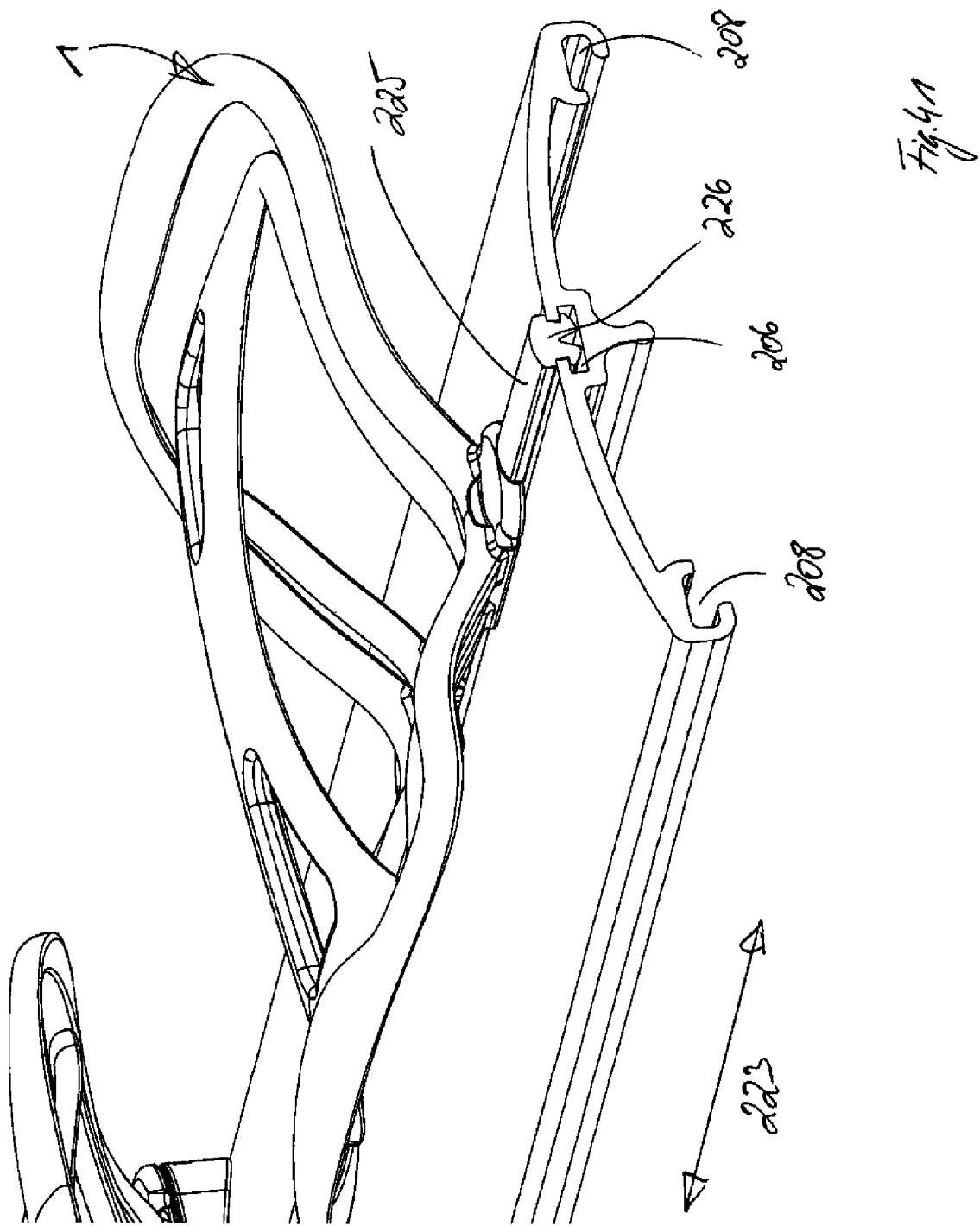

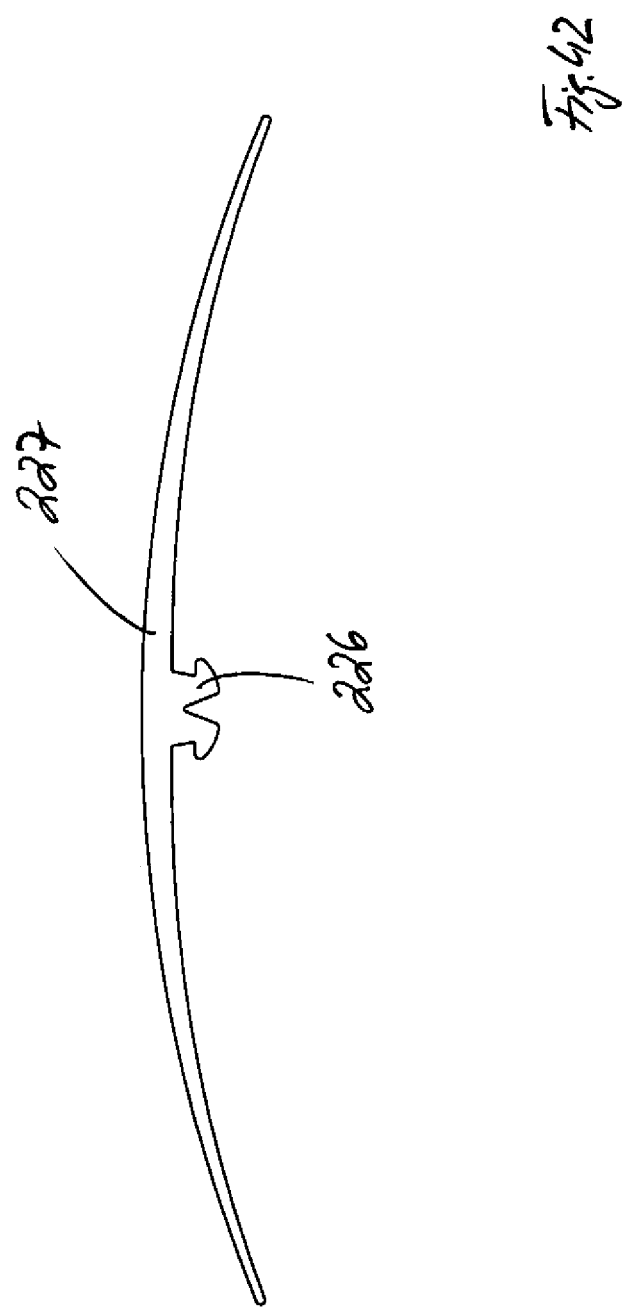

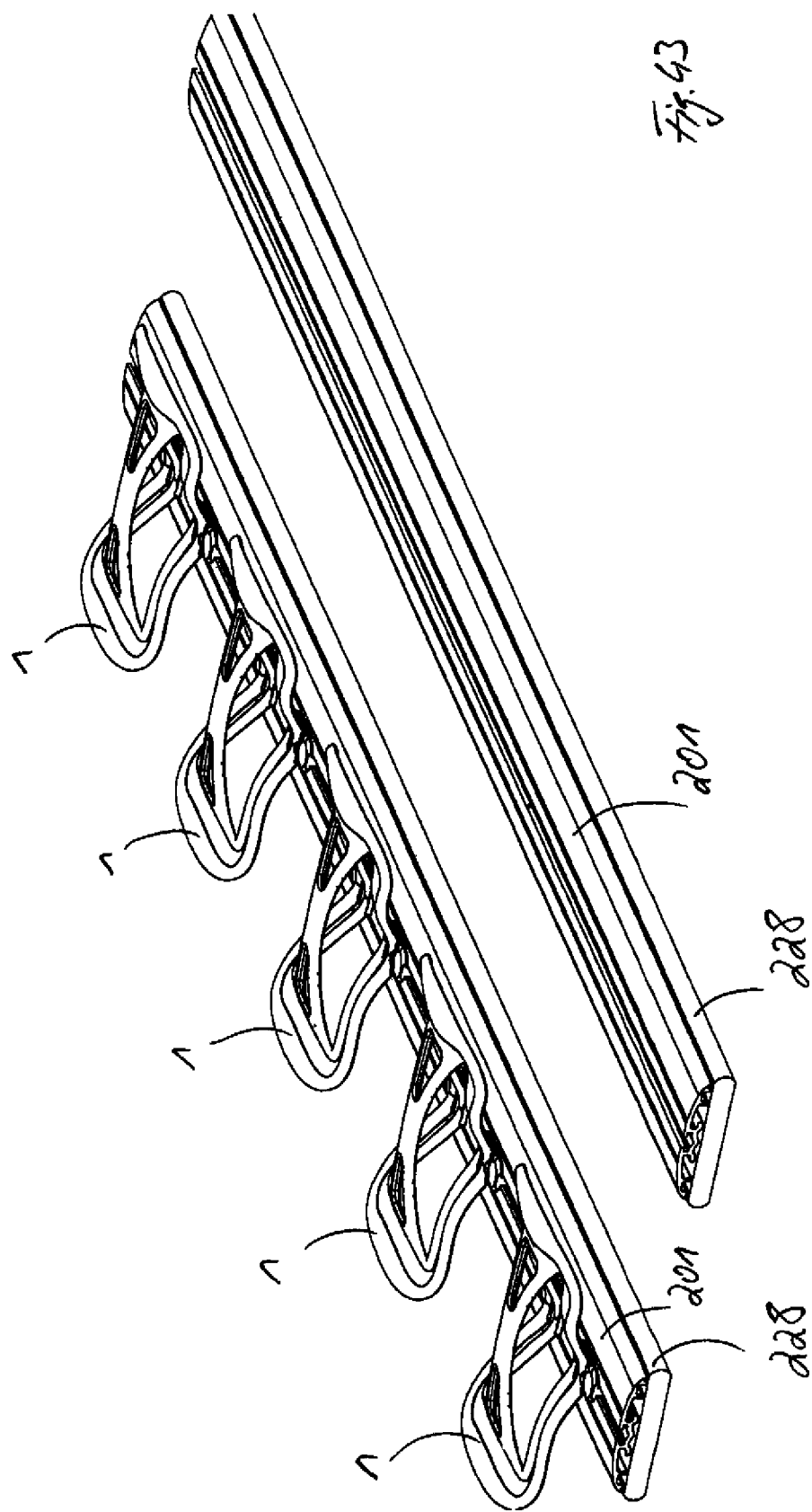

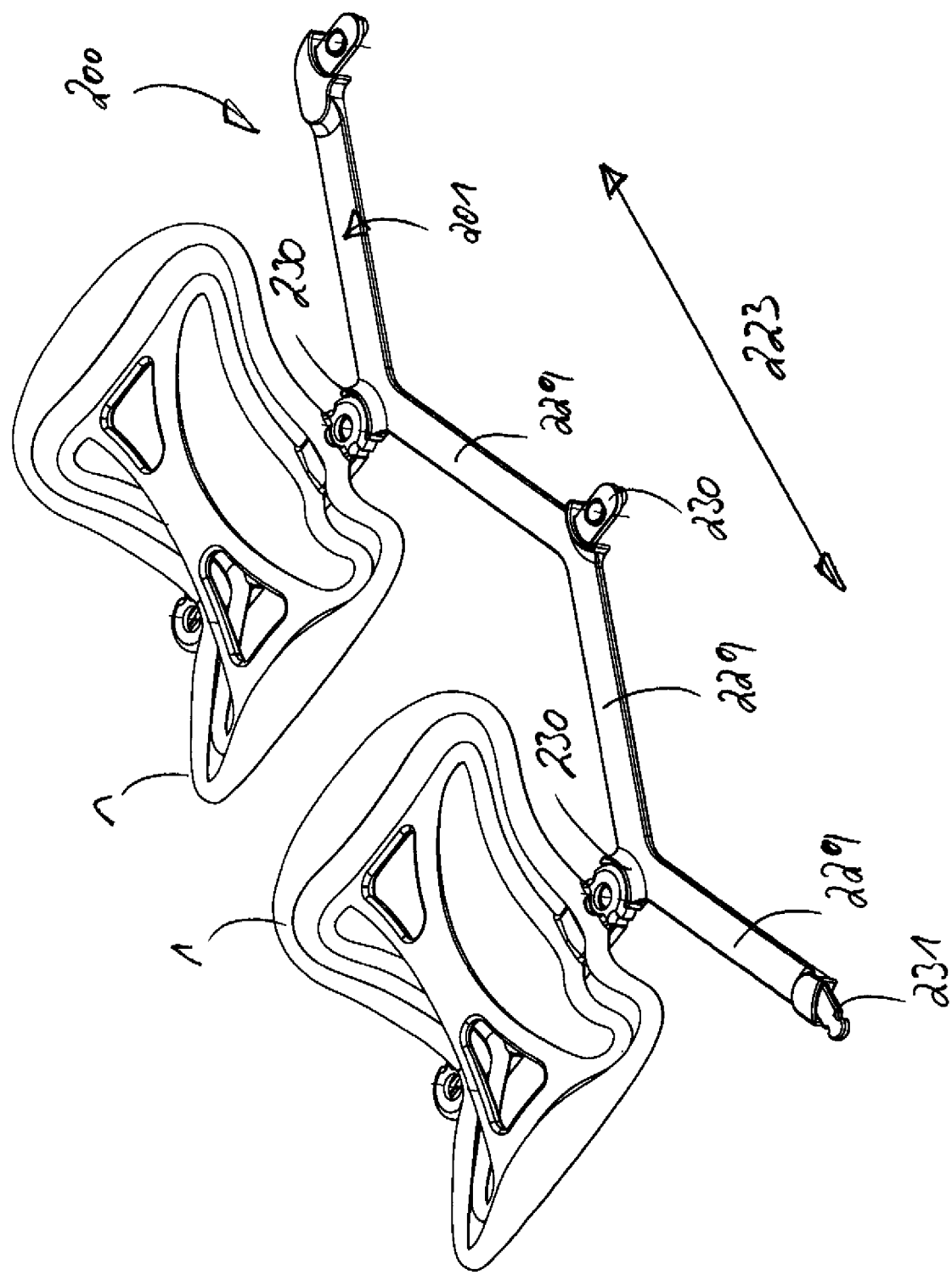

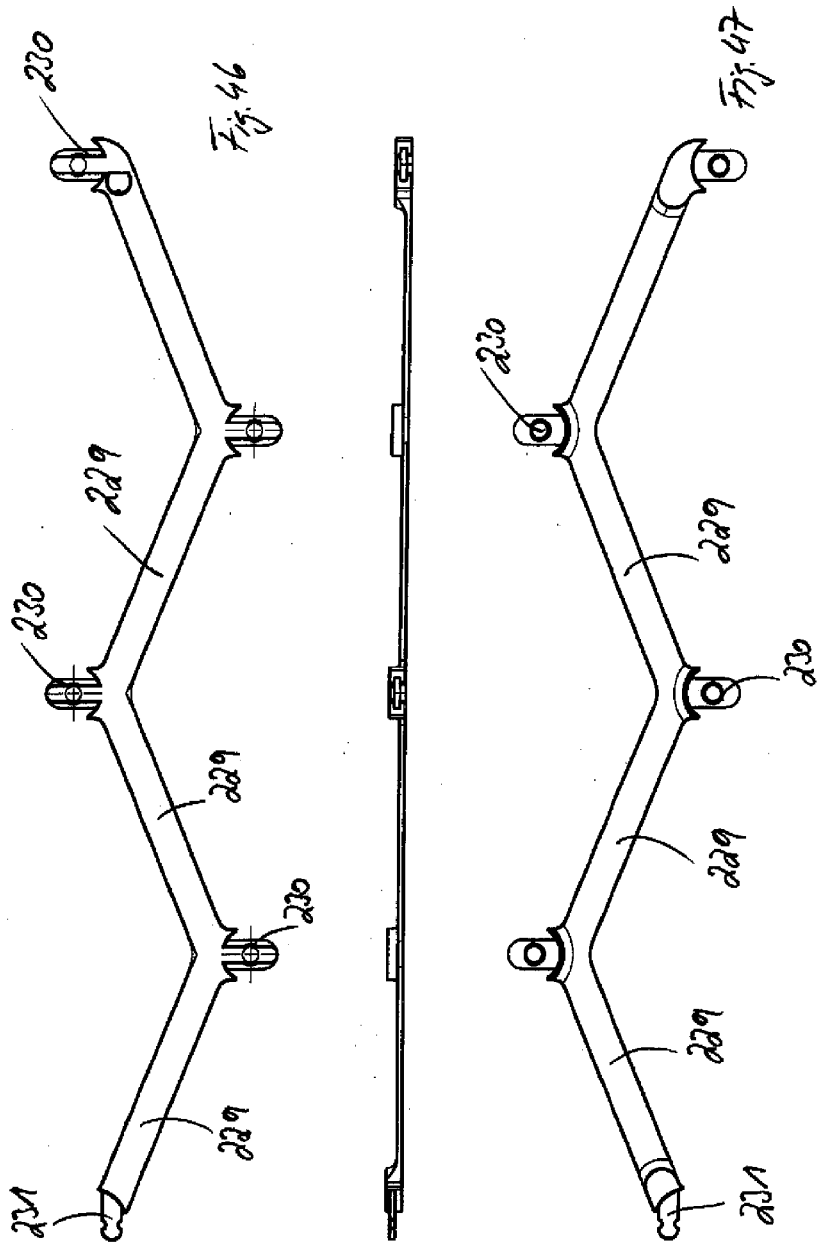

SPRING ELEMENT

BACKGROUND OF THE INVENTION

The invention relates to a spring element for a cushioning device of a piece of furniture for sitting or lying, in particular for a bed mattress, comprising a spring body and an accommodating section arranged thereon, wherein the spring body and the accommodating section are injection-molded from plastic as one piece.

SUMMARY OF THE INVENTION

Spring elements of the initially mentioned, i.e. generic type are well known by themselves from the state of the art, for which reason no special reference has principally to be made to prior publications here. Only WO 2005/048781 A and EP 1 046 361 A may be exemplarily mentioned. Furthermore, it is referred to DE 2 015 659 A and WO 01/50923 A, wherein DE 2 015 659 does not show an injection-molded spring element and WO 01/50923 A does not show a spring element in one piece.

Other spring elements are known from DE 20 2009 006 802 U1, EP 1 602 303 B1 and EP 2 220 968 A1. Herein, DE 20 2009 006 802 U1 relates to a spring element which is composed of a base, a cover plate and a spring body that is arranged between the base and the cover plate. The cover plate is formed by two longitudinal parts which are placed side by side, wherein each part is supported by its own individual spring body with respect to the base.

The above mentioned spring elements serve to be used in connection with a cushioning device, in particular in connection with a bed mattress. Herein, the spring elements can either be placed in corresponding recesses of the cushioning device or serve to support this one, wherein in this case they are supported by a carrying device, for example in form of a slatted frame.

Although known spring elements have proved to be useful in daily practice, there is need of improvement, in particular in view of a wider field of applications. Therefore, it is the object of the invention to improve a spring element of the initially mentioned type such that this one can be used for a wider field of applications.

For achieving this aim, the invention proposes a spring element of the initially mentioned type, which is characterized in that the spring body is designed as a ring part extended in the longitudinal direction, which ring part comprises two ring part sections that transition into each other as one piece in a center section, said ring part sections each having an upward slope in the height direction starting from the center section, wherein the end areas of the ring part sections lying opposite each other in the longitudinal direction are connected to each other, the accommodating section lying therebetween.

The spring element according to the invention stands out for its filigree geometrical design which enables a stable and robust use while simultaneously providing excellent resilience capacities. Therefore, a use of the spring element according to the invention is advantageously possible in a wide range of applications.

According to the invention, the spring body is designed as a ring part extended in the longitudinal direction. This ring part comprises a first ring part section and a second ring part section. Both ring part sections are designed such that they transition into each other as one piece in a center section. In the area of the center section, the ring part is preferably tapered, such that altogether a geometrical design of the ring part results which is similar to butterfly wings.

Each one starting from the center section, the ring part sections have an upward slope in the height direction. In the due case of a load, the ring part sections can be compressed downwards thanks to this design.

The ring part sections have got end areas, respectively. These ones are lying opposite each other in the longitudinal direction. In so far each ring part section provides two spring arms, starting from the center section, which spring arms are coupled to each other at the other end via the respective end area. Herein, the spring arms of the individual ring part sections transition into each other as one piece in the same way as the respective end areas of the ring parts transition into the associated spring arms as one piece.

The end areas of the ring part sections lying opposite each other in the longitudinal direction are connected to each other, the accommodating section lying therebetween. Thanks to this design, the ring part sections are not only connected to each other via the center section but also via the accommodating section. Herein, the accommodating section is preferably designed as tapered strip element and has a crowned design with respect to its longitudinal extension, thus it has got a curved extension, the top section of which in the height direction is lying opposite the center section of the spring body.

In the due application case, the accommodating section serves as abutment of a cushioning device when forces are introduced. If in the due application case forces are introduced, the accommodating section itself can be compressed and this with respect to the spring body. The force which has been introduced in the due case of strain can be transmitted from the accommodating section to the spring body of the spring element, which is consequently also compressed. Herein, the two ring part sections of the spring body can spread apart from each other, wherein the possible spreading movement is limited by the accommodating section arranged between the two end areas of the ring part sections. Thanks to this construction according to the invention, a stable and strong overall structure with a simultaneously excellent resilience capacity results.

The spring element is designed symmetrically with respect to the center section of the spring body. In the case of strain, an optimum force introduction is assured. Uneven strains which could lead to evading movements can advantageously be completely avoided.

Furthermore, the accommodating section can comprise breakthroughs, wherein it is preferably provided that these ones are adjacent to the end areas of the ring part sections. The provision of such breakthroughs has in particular the advantage that forces can be introduced in an optimum way into the ring part sections.

According to another feature of the invention, the spring body comprises two connecting extensions on the outer side of the ring part, which are placed opposite each other in the transverse direction of the ring part and preferably form one piece with the ring part.

These connecting extensions serve to allow placing the spring element on a carrying device in a position safe manner. Such a carrying device can be for example the slat of a slatted frame. The connecting extensions can have through holes through which fastening means in form of screws, rivets and/or the like can be guided through for fastening the spring element on the carrying device. In an alternative embodiment, the connecting extensions can also comprise pins which engage in corresponding bores of the carrying device in the finally assembled state of the spring elements.

Furthermore, the connecting extensions can serve to combine two spring elements with each other for forming a common spring module.

According to another feature of the invention, a connecting device can be used for the connection of individual spring elements. This connecting device has a pin-shaped base body which respectively carries connecting sections on the side of the one end and on the side of the other end, which connecting sections are formed correspondingly to the connecting extensions of the spring elements. The connecting device serves as connecting link between two spring elements to be connected to each other, wherein the spring elements can be combined with each other both one above the other in the direction of height and one after the other in the longitudinal direction. In the last case, the connecting devices also serve as spacers between respectively two spring elements.

According to another feature of the invention, the spring element has a second spring body. Actually, this second spring body comprises a comparable design with respect to the first spring body, i.e. in form of a ring part extended in the longitudinal direction. This ring part also comprises a center section, starting from which two ring part sections are formed which transition into each other as one piece. Furthermore, like the ring part sections of the first spring body, the ring part sections of the second spring body have an upward slope in the height direction starting from the associated center section. The ring part of the second spring body is tapered in the area of the center section and shows in so far a butterfly wing-like design in accordance with the design of the first spring body.

The ring part sections of the second spring body have end areas lying opposite the associated center section. These end areas are preferably thickened in the direction towards the center section. Herein, these thickenings respectively represent a sort of accommodating section which serves to introduce forces in an optimum manner into the ring part sections in the due application case.

The ring part of the second spring body encompasses the ring part of the first spring body. Both ring parts are preferably aligned concentrically. Herein, it is preferably provided that the end areas of the ring part sections of the first spring body are curved in the direction towards the center section. Due to this design, the clearance between the respective end areas of the ring parts of the first and second spring bodies increases. Thanks to this increased clearance, the above described thickening of the end areas of the ring parts of the second spring body becomes possible. As a result, a constant distance between the entire circumference of the ring part of the first spring body and the ring part of the second spring body is thus obtained.

Both spring bodies are preferably made of one piece, wherein the spring bodies are connected to each other, the connecting extensions of the first spring body being interposed. In so far, the connecting extensions also serve as spacers between the ring parts of both spring bodies.

On the outer side of the ring part, the center section of the second spring body preferably carries two coupling elements which are lying opposite each other in the transverse direction of the ring part. These coupling elements preferably form one piece with the ring part.

The coupling elements serve to enable to combine two spring elements with each other, either in the height direction for forming a spring module or in the longitudinal direction for forming spring elements which are placed in a line one after the other. Herein, also a connecting device can be used in an already previously described manner, wherein the connecting device comprises connecting sections which are corresponding both to the connecting extensions and the coupling elements of the spring elements.

Both the spring elements and the connecting devices are preferably designed according to the mono sandwich style, i.e. they are composed of a two-component artificial material, wherein the one plastic component forms the core and the other plastic component forms an envelope which encompasses the core.

According to a preferred embodiment of the invention, the coupling elements of the spring element are equipped with a T-shaped groove or a T-shaped connecting piece, in which case the coupling elements can be called connecting sections.

It is preferred to provide spring elements having connecting sections which comprise a T-shaped groove, on the one hand, and spring elements having connecting sections which comprise a T-shaped connecting piece, on the other hand. Herein, the T-shaped connecting pieces are formed correspondingly to the T-shaped grooves, such that two spring elements having correspondingly designed connecting sections can be combined with each other to form a common spring module, which spring module has two spring elements placed one above the other in the height direction in the finally assembled state. Herein, the spring elements can be designated as male and female spring elements in view of their design with respect to their connecting sections. A female spring element and a male spring element can be combined with each other in the above described manner.

The connecting sections of the spring elements which are designed in the above described manner furthermore serve to place the spring elements in a simplified way on a connecting structure, for example in the form of a connecting rail which receives a plurality of individual spring elements and combines them with each other to form groups. Depending on the design of the connecting sections of the spring elements, such a connecting rail can have a T-shaped groove or a T-shaped connecting piece as connecting means.

Furthermore, the invention proposes a spring system for a bottom springing of a cushioning and/or mattress device of a piece of furniture for sitting and/or lying, comprising a plurality of spring elements and a plurality of connecting rails, by means of which spring elements can be combined with each other to form groups, wherein the spring elements comprise connecting sections and the connecting rails comprise connecting means which are correspondingly designed to the connecting sections of the spring elements.

Spring systems of this type are well known from the state of the art. They serve for example as bottom springing of a bed mattress in beds. A spring system is for example known from EP 1 358 825 A1.

A previously known spring system comprises spring elements on the one hand and connecting rails on the other hand. Herein, several spring elements can be combined with each other to form a group by means of a connecting rail. Depending on the size of the cushioning and/or mattress device to be provided with a bottom springing, a plurality of connecting rails can be used, wherein each connecting rail carries a multitude of spring elements which are arranged side by side in the longitudinal direction of the connecting rail.

For connecting the spring elements to the connecting rail it is known from the state of the art according to EP 1 358 825 A1 to use a hammer head system similar to a bayonet joint. According to this system, a connecting rail is equipped with hammer or mushroom heads at predetermined points. The spring elements to be coupled to the connecting rail comprise bores corresponding to the hammer or mushroom heads of the connecting rail. In the case of assembly, the spring elements have to be placed with their respective bores first on a hammer or mushroom head, such that the hammer or mushroom head of the connecting rail can immerse into the bore provided by the spring element. Then, the spring element has to be turned by an angle of for example 90°, such that the hammer or mushroom head of the connecting rail and the spring element get locked with each other.

Although the above described design has proved to be useful in daily practice, it has got disadvantages. On the one hand, the start equipment of a connecting rail has proved to be disadvantageous because of the quite complex mounting of the spring elements. On the other hand, the known construction is not flexible with respect to the positioning of the spring elements. In so far, there is need of improvement, whereby a spring system is desired which enables an altogether simplified handling with simultaneous increase of efficiency.

Therefore, the invention proposes a spring system which is characterized in that either the connecting sections of the spring elements or the connecting means of the connecting rails provide a T-shaped groove.

On the base of the construction according to the invention, a connection between a connecting rail, on the one hand, and the associated spring elements of this connecting rail, on the other hand, is proposed, which connection comprises a T-shaped groove. Herein, the T-shaped groove can be provided either on the side of the spring elements or on the side of the connecting rail, for which reason the invention proposes that either the connecting sections of the spring elements or the connecting means of the connecting rails provide a T-shaped groove.

In the finally assembled state, the T-shaped groove provided according to the invention cooperates with a corresponding counterpart which is T-shaped corresponding to the shape of the groove. The counterpart is either provided by the connecting sections of the spring elements or by the connecting means of the connecting rails, depending on the fact whether the connecting sections of the spring elements or the connecting means of the connecting rail carry a T-shaped groove. In any way, in the finally assembled state, the T-shaped groove and the corresponding T-shaped counterparts engage into each other.

The design according to the invention in particular offers the advantage that a simplified assembly is possible. Thus, the groove and counterpart can be mounted fast and reliably by simply inserting them into each other. Furthermore, depending on the design of the connecting rail, an individual positioning of the spring elements with respect to the connecting rail carrying the spring elements in the assembled state can be carried out. It is in particular possible to individually set the distance between adjacent spring elements in the longitudinal direction of the connecting rail in a simple manner.

Depending on the application case, the connecting rails can be different.

According to a first alternative, the connecting rails extend linearly similar to slats of a slatted frame. They carry the zone for connecting the spring elements on their one upper side. Herein, a connecting means for the detachable connection to the spring elements is provided in form of a T-shaped groove which extends centrically and linearly over the entire longitudinal extension of the connecting rails. In the already above described manner, the spring elements in their turn comprise connecting sections which are T-shaped counterparts for the T-grooves of the connecting rails.

According to the above described alternative, a connecting rail can be either self-supporting or not self-supporting. In case of a not self-supporting design, the connecting rail is received in a carrying support, wherein this one can be for example the slat of a slatted frame or also a lattice work. In case of a lattice work as carrying support, also several connecting rails can be allocated to a common carrying support.

According to the above described alternative, the connecting rail is preferably made of an aluminum profile, for example an extruded profile.

According to an alternative design, it is provided that a connecting rail is formed by individual sections which are oriented in an angled way with respect to each other. According to this embodiment, a connecting rail does thus not extend linearly, but rather comprises individual sections which are angled by an angle of <180°, for example 110°, 120°, 130° or 140° with respect to each other. In this way, a sort of "zigzag" arrangement is formed. For connecting spring elements to such a designed connecting rail, preferably connecting means in form of connecting pieces are used, the cross section of which is T-shaped. Accordingly, the connecting sections of the spring elements respectively have a T-shaped groove. In the finally assembled state the T-shaped connecting pieces of the connecting rail engage in the respective grooves of the connecting sections of the spring elements.

According to a special embodiment of the invention, the connecting pieces can be oriented in a transverse direction with respect to the longitudinal extension of the connecting rail. Herein, the connecting pieces preferably debouch into the connecting rail in a respective transition area between two sections of the connecting rail.

Thanks to the spring system according to the invention, a construction is proposed which can be altogether more easily handled and assembled or disassembled and which furthermore offers an increased efficiency since it meets individual requirements in a better way. The individual components belonging to the spring system, such as in particular the spring elements and the connecting rails can be combined with each other according to the modular concept and can be varied depending on the system, which was not possible with devices known from the state of the art.

BRIEF DESCRIPTION OF THE DRAWINGS

Other features and advantages of the invention will become apparent from the following description by means of the figures. Herein.

FIG. 10 is a schematic perspective view of a spring module according to the invention;

FIG. 11 is a schematic perspective view from above of a first design of another embodiment of the spring element according to the invention;

FIG. 12 is a top view from above of the spring element according to FIG. 11;

FIG. 13 is a partially cut side view of the spring element according to FIG. 12 along the cutting line A-A in FIG. 12;

FIG. 14 is a partially cut side view of the spring element according to FIG. 12 along the cutting line B-B in FIG. 12;

FIG. 15 is a schematic perspective view from above of a second design of the other embodiment of the spring element according to the invention;

FIG. 19 is a schematic perspective view of a connecting device according to a second embodiment;

FIG. 20 is a top view from above of the connecting device according to FIG. 19;

FIG. 21 is a side view of the connecting device according to FIG. 19;

FIG. 22 is a front view of the connecting device according to FIG. 19;

FIG. 28 is a schematic perspective view of a connecting device;

FIG. 29 is a side view of the connecting device according to FIG. 28;

FIG. 30 is a top view from above of the connecting device according to FIG. 28;

FIG. 31 is a cut side view of the connecting device according to FIG. 30 along the cutting line B-B in FIG. 30;

FIG. 32 is a side view of two spring modules according to FIG. 26 which have been combined with each other by means of a connecting device according to FIG. 28;

FIG. 33 is a schematic perspective view of a spring system according to the invention;

FIG. 34 is a schematic perspective view from below of the spring system according to FIG. 33;

FIG. 35 is a top view from above of the spring system according to FIG. 33;

FIG. 36 is a schematic explosion view of a connecting rail equipped with spring elements;

FIG. 37 is a partially cut front view of the spring system according to FIG. 33 in a first built-in state;

FIG. 38 is a front view of the spring system according to FIG. 33 in a second built-in state;

FIG. 39 is a schematic perspective view of an adapter according to the invention;

FIG. 40 is a schematic perspective view of a first embodiment of a connecting rail according to the invention;

FIG. 41 is a schematic perspective view of the connecting rail according to FIG. 40 with a mounted spring element;

FIG. 42 is a schematic front view of a cover according to the invention;

FIG. 43 is a schematic perspective view of a second embodiment of a connecting rail according to the invention;

FIG. 45 is a schematic perspective view of a third embodiment of a connecting rail according to the invention;

FIG. 46 is a plan view from below of a connecting rail according to FIG. 45 and

FIG. 47 is a top view from above a connecting rail according to FIG. 45.

DESCRIPTION OF PREFERRED EMBODIMENTS

In FIGS. 1 through 8, different embodiments of the spring element 1 according to the invention are visible. FIG. 9 shows a spring element mat 70 formed by several spring elements 1.

Figure 1:
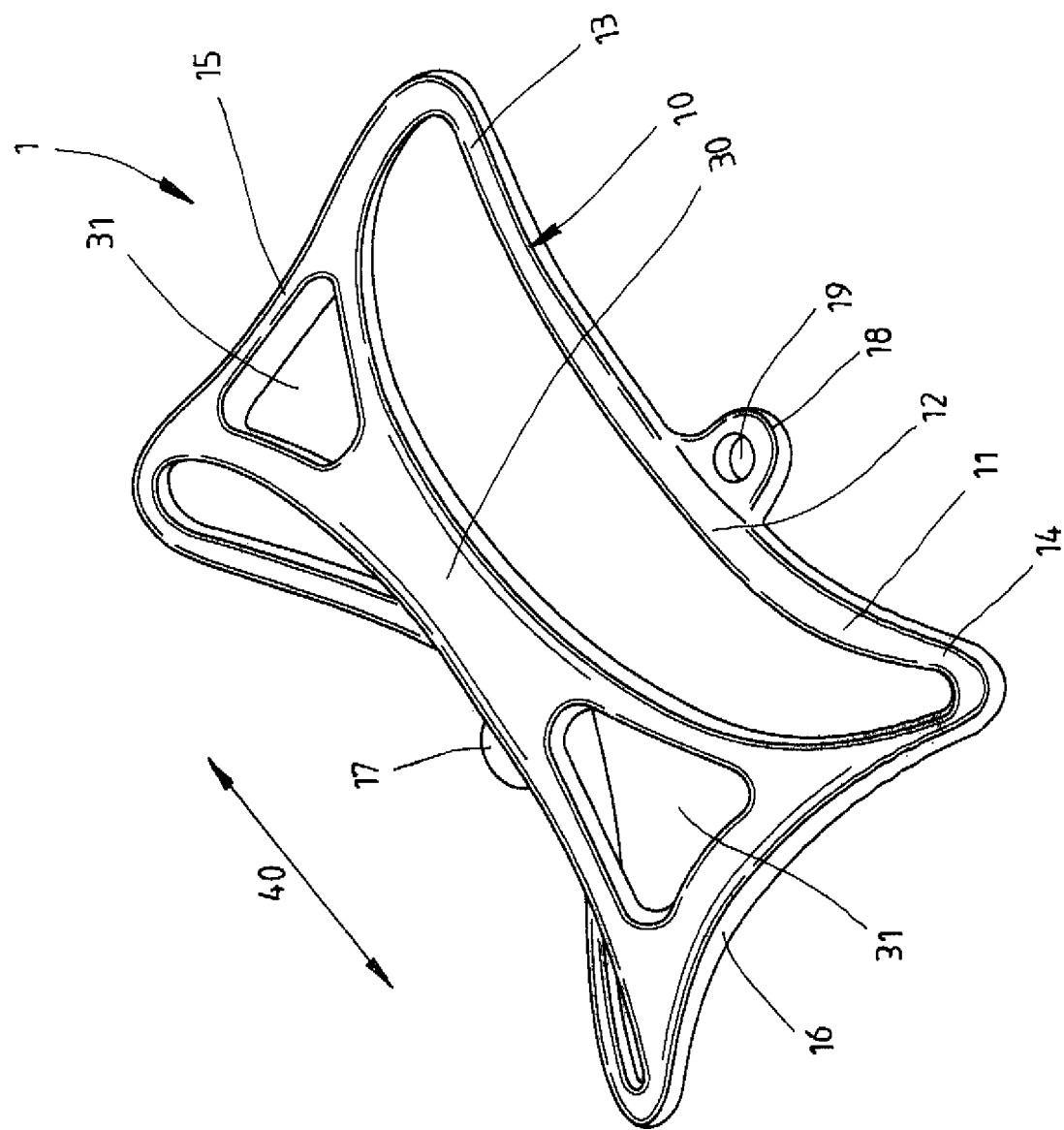
FIG. 1 is a schematic perspective view which shows a first embodiment of the spring element according to the invention from above.

In FIG. 1, a first embodiment of the spring element 1 according to the invention is visible. The spring element 1 comprises a spring body 10 and an accommodating section 30. Herein, the spring body 10 and the accommodating section 30 are injection-molded from plastic as one piece, preferably in the mono sandwich style.

The spring body 10 is designed as a ring part 11 extended in the longitudinal direction 40. The ring part 11 comprises two ring part sections 13 and 14 that transition into each other as one piece in a center section 12, said ring part sections each having an upward slope in the height direction 42 starting from the center section 12, as it is in particular visible in the representation according to FIG. 2. The end areas 15 and 16 of the ring part sections 13 and 14 lying opposite each other in the longitudinal direction 40 are connected to each other, the accommodating section 30 lying therebetween.

According to the embodiment of FIG. 1, the accommodating section 30 is provided with breakthroughs 31. According to an alternative embodiment, the accommodating section 30 can also be designed as a continuous piece, i.e. it can have no breakthroughs in contrast to the embodiment represented in FIG. 1.

Figure 3:
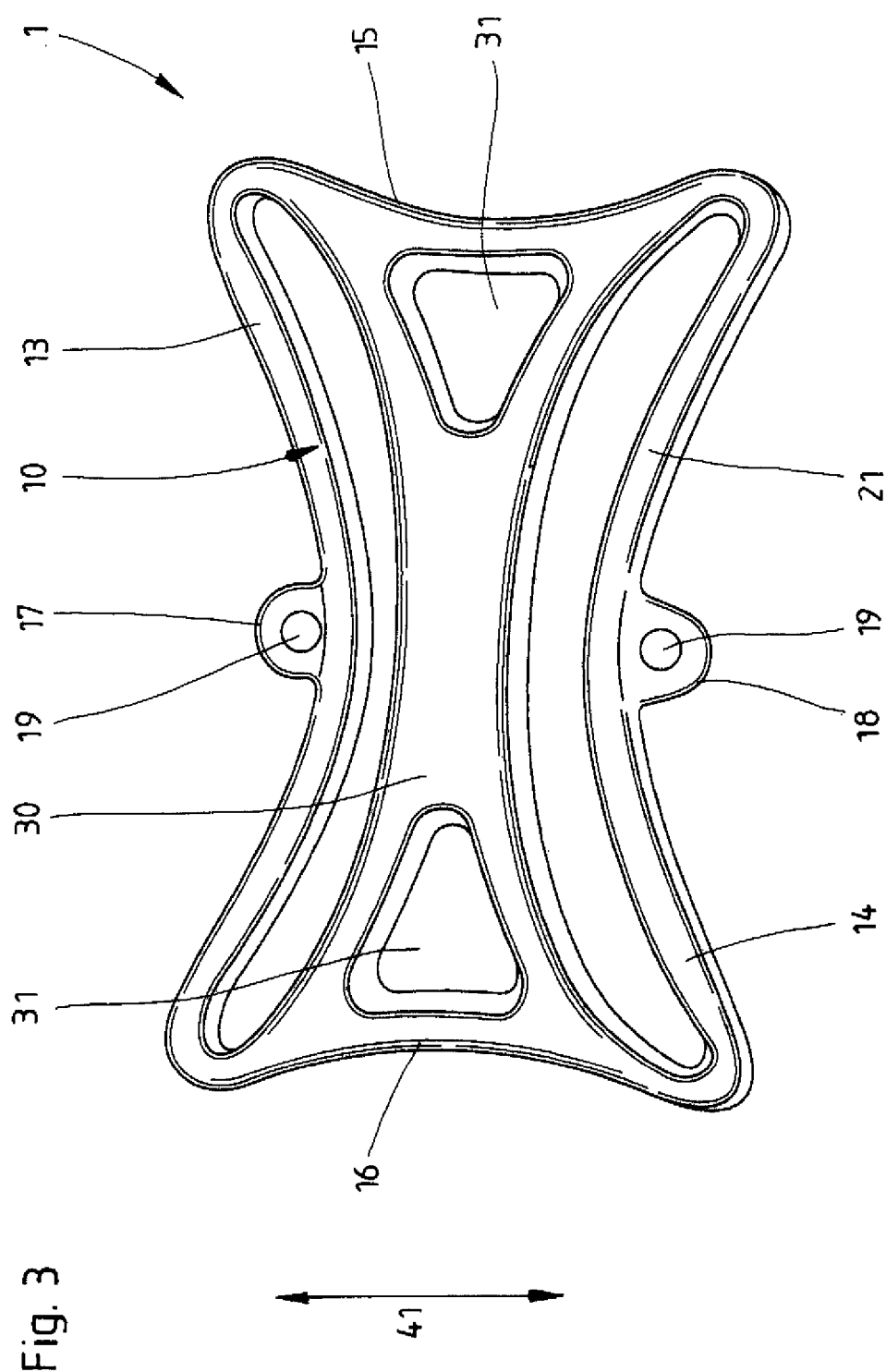
FIG. 3 is a schematic top view from above of the spring element according to FIG. 1.

Like the accommodating section 30, the ring part 11 of the spring body 10 is tapered in the area of the center section 12. Furthermore, the end areas 15 and 16 of the ring part sections 13 and 14 are respectively curved in the direction towards the center section 12. This fact becomes in particular apparent, if the FIGS. 1 and 3 are seen together.

Figure 2:
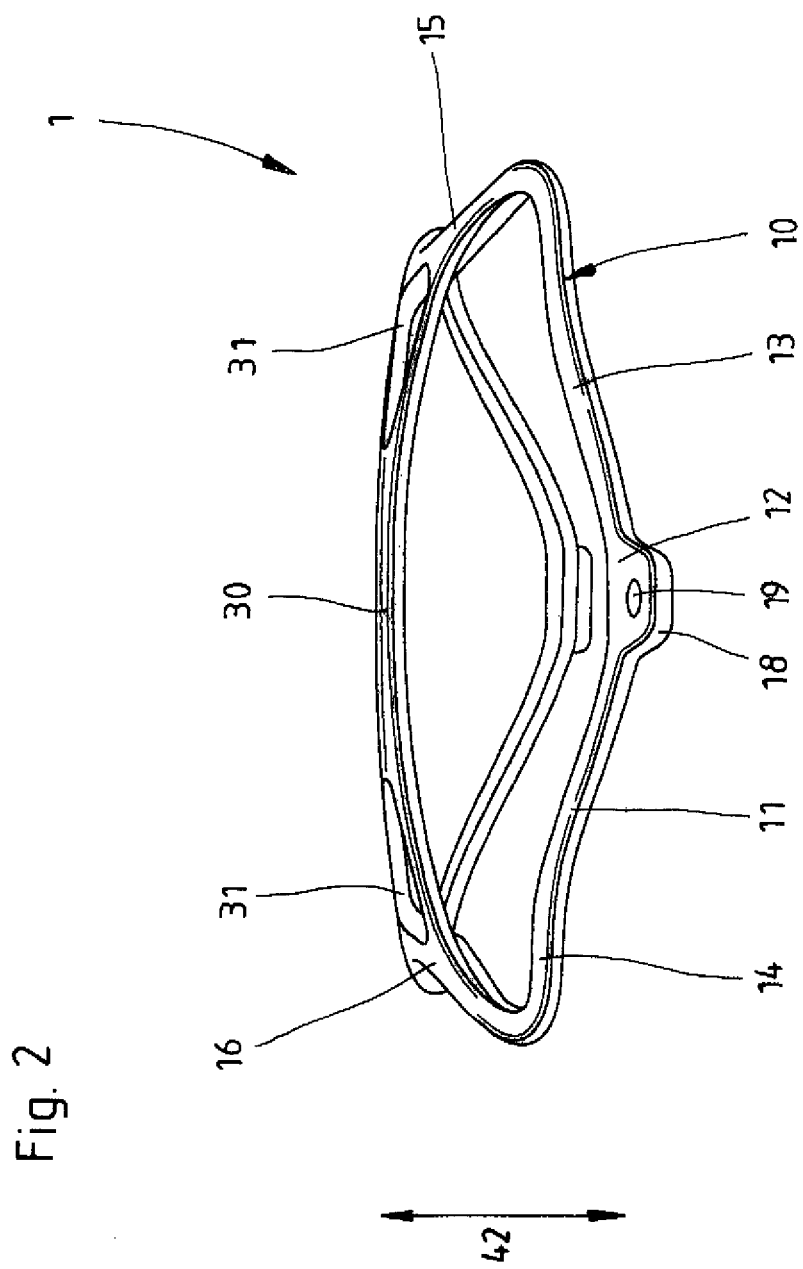
FIG. 2 is a schematic side view of the spring element according to FIG. 1.

As it is in particular visible in the representation of FIG. 2, the accommodating section 30 is crowned with respect to its longitudinal extension 40. The end areas 15 and 16 of the ring part sections 13 and 14 are connected to each other while this accommodating section 30 is interposed.

The ring part 11 comprises two connecting extensions 17 and 18 on the outer side of the ring part, which are placed opposite each other in the transverse direction 41 of the ring part 11. These connecting extensions 17 and 18 serve to connect two spring elements 1 and/or to place a spring element 1 on a carrying device, for example a slat of a slatted frame. For this purpose, the connecting extensions 17 and 18 comprise bores 19, into which connecting pins engage in the due application case. Such connecting pins can be provided on the side of the carrying device. Alternatively it is imaginable to rivet or to screw the spring elements 1 on the carrying device, wherein the bores 19 serve to lead through such connecting elements. Alternatively to the shown embodiment, also pins and/or the like can be provided instead of the bores 19, wherein in this case, the carrying device which receives the spring elements 1 is equipped with corresponding connecting bores.

Figure 4:
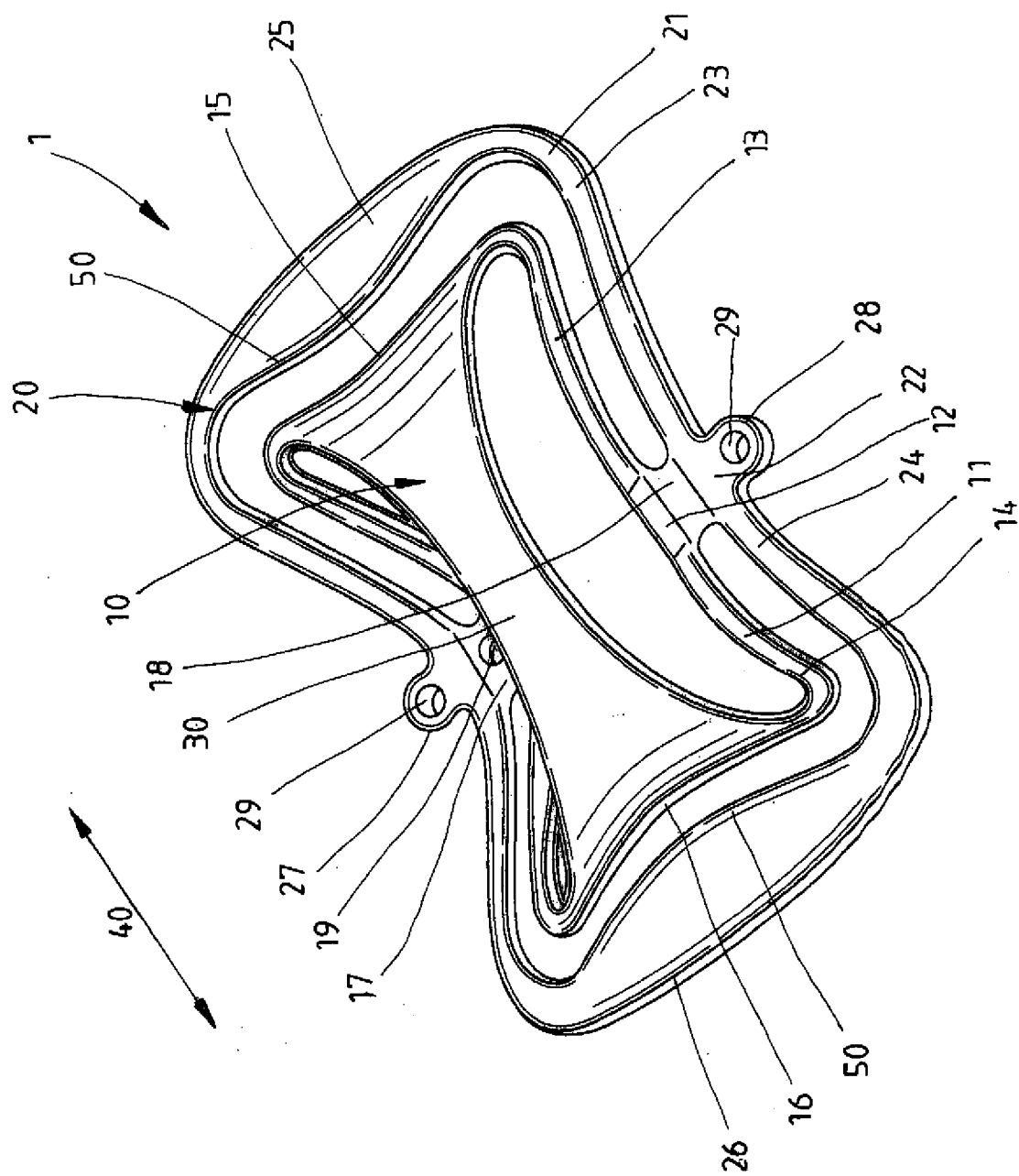
FIG. 4 is a schematic perspective view from above of a second embodiment of the spring element according to the invention.
Figure 5:
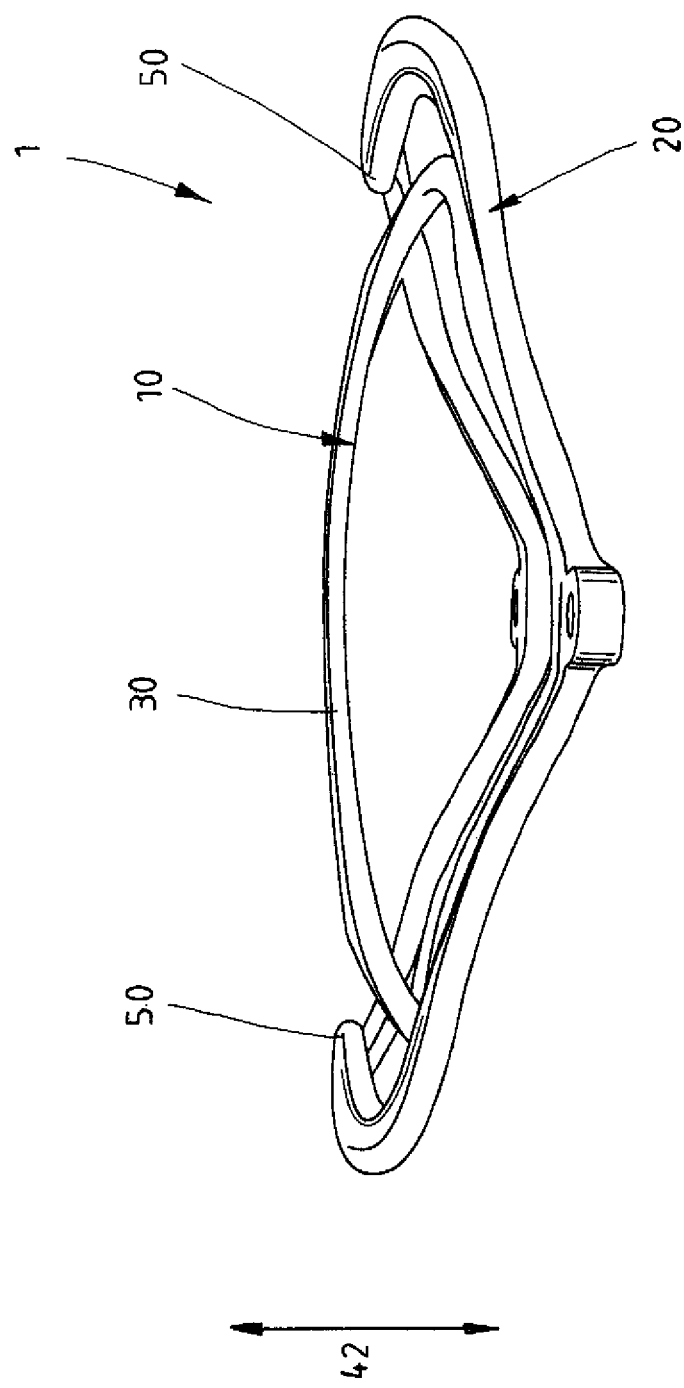
FIG. 5 is a schematic id view of the spring element according to FIG. 4.
Figure 6:
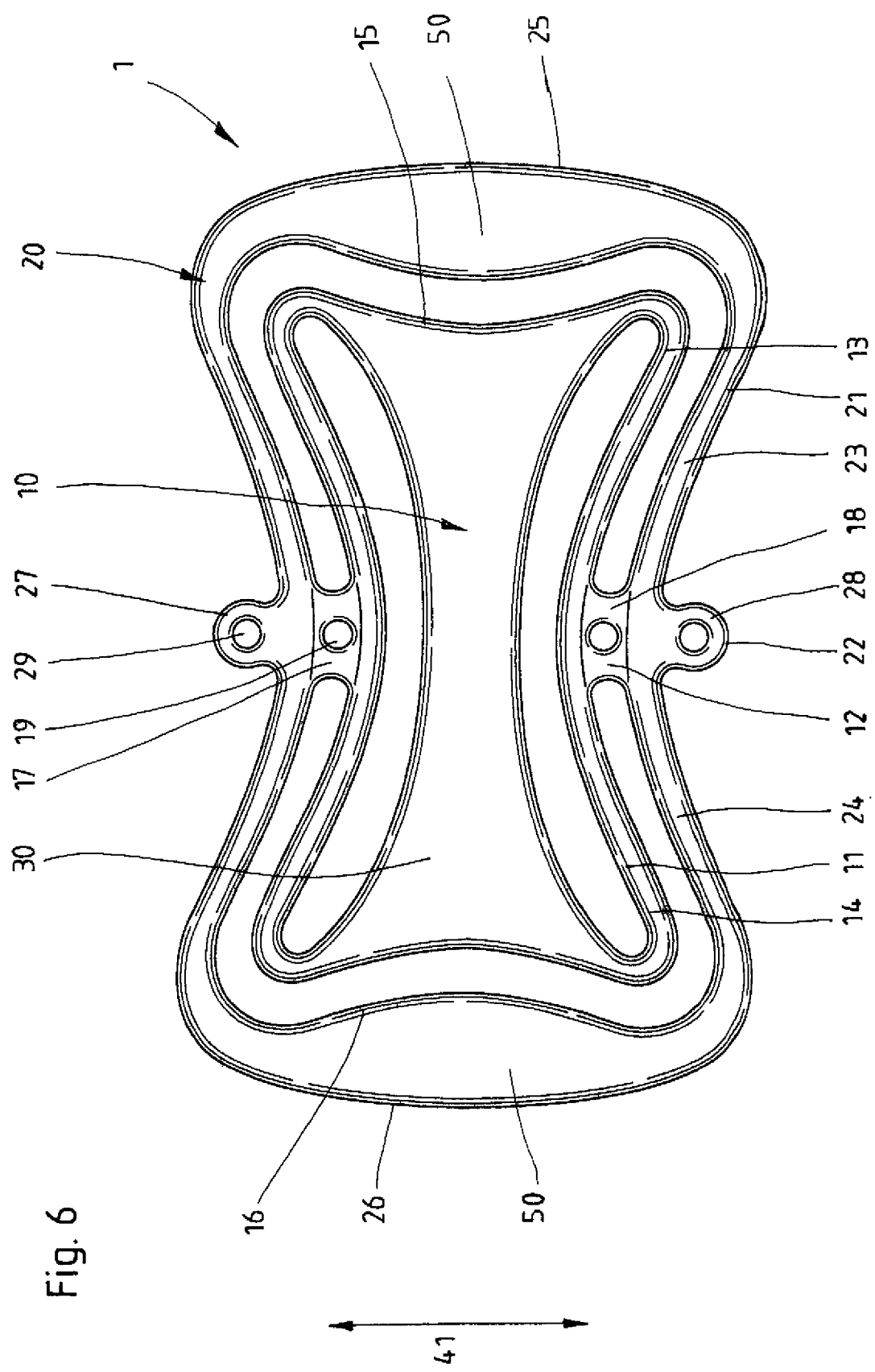
FIG. 6 is a schematic top view from above of the spring element according to FIG. 4.

The embodiment according to FIGS. 4 through 6 shows another design of the invention. According to this embodiment, the spring element 1 comprises a second spring body 20. Corresponding to the first spring body 10, this second spring body is designed as a ring part 21 and comprises two ring part sections 23 and 24 starting from a center section 22. These ring part sections 23 and 24 respectively provide end areas 25 and 16 which respectively carry a thickening 50 in the direction towards the center is section 22.

As it is in particular visible in the representation of FIG. 4, the ring part 21 of the second spring body 20 encompasses the ring part 11 of the first spring body 10. Herein, the two spring bodies 10 and 20 are formed as one piece, wherein the spring bodies 10 and 20 are connected to each other by interposition of the connecting extensions 17 and 18 of the first spring body 10. These connecting extensions 17 and 18 can each comprise the already above described bores 19, into which connecting means in the form of screws, rivets, pins and/or the like can be guided for the purpose of connecting the spring element 1 to a carrying device and/or connecting two spring elements 1. Alternatively, the connecting extensions can also be designed without bores, as it is exemplarily represented by means of the connecting extension 18 in FIG. 4.

On the outer side of the ring part, the ring part 21 of the second spring body 20 comprises two coupling elements 27 and 28 which are lying opposite each other in the transverse direction 41 of the ring part 21, as it is in particular visible in the representation of FIG. 6. These coupling elements 27 and 18 also serve to connect two spring elements 1 and/or to place the spring element 1 on a carrying device. For this purpose, the coupling elements 27 and 28 comprise connecting devices in form of bores and/or pins 29, which fact will in particular become apparent, if the FIGS. 4 and 6 are seen together.

Figure 7:
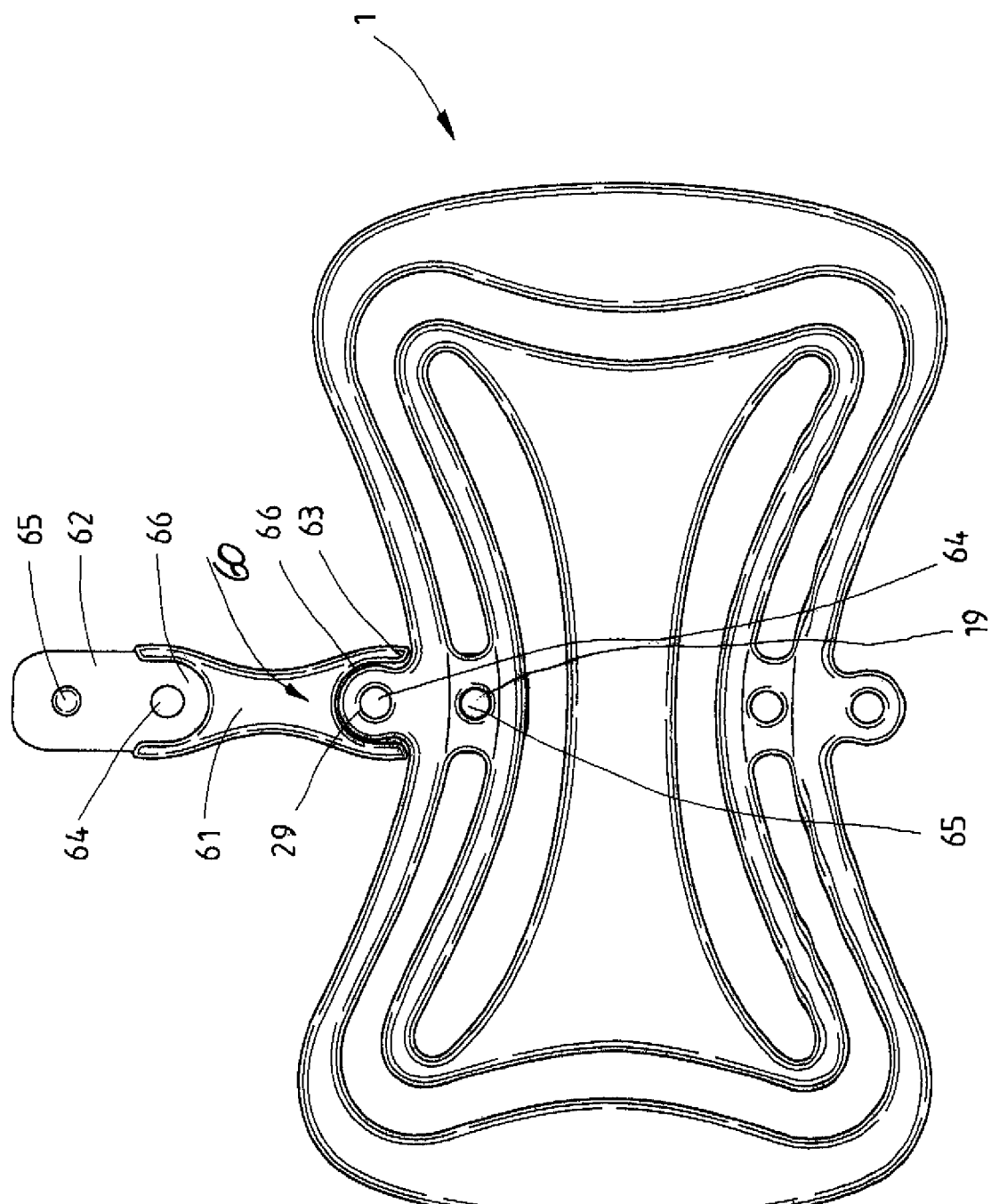
FIG. 7 is a schematic top view from above of the spring element, according to the invention according to FIG. 4 in combination with a connecting device.
Figure 8:
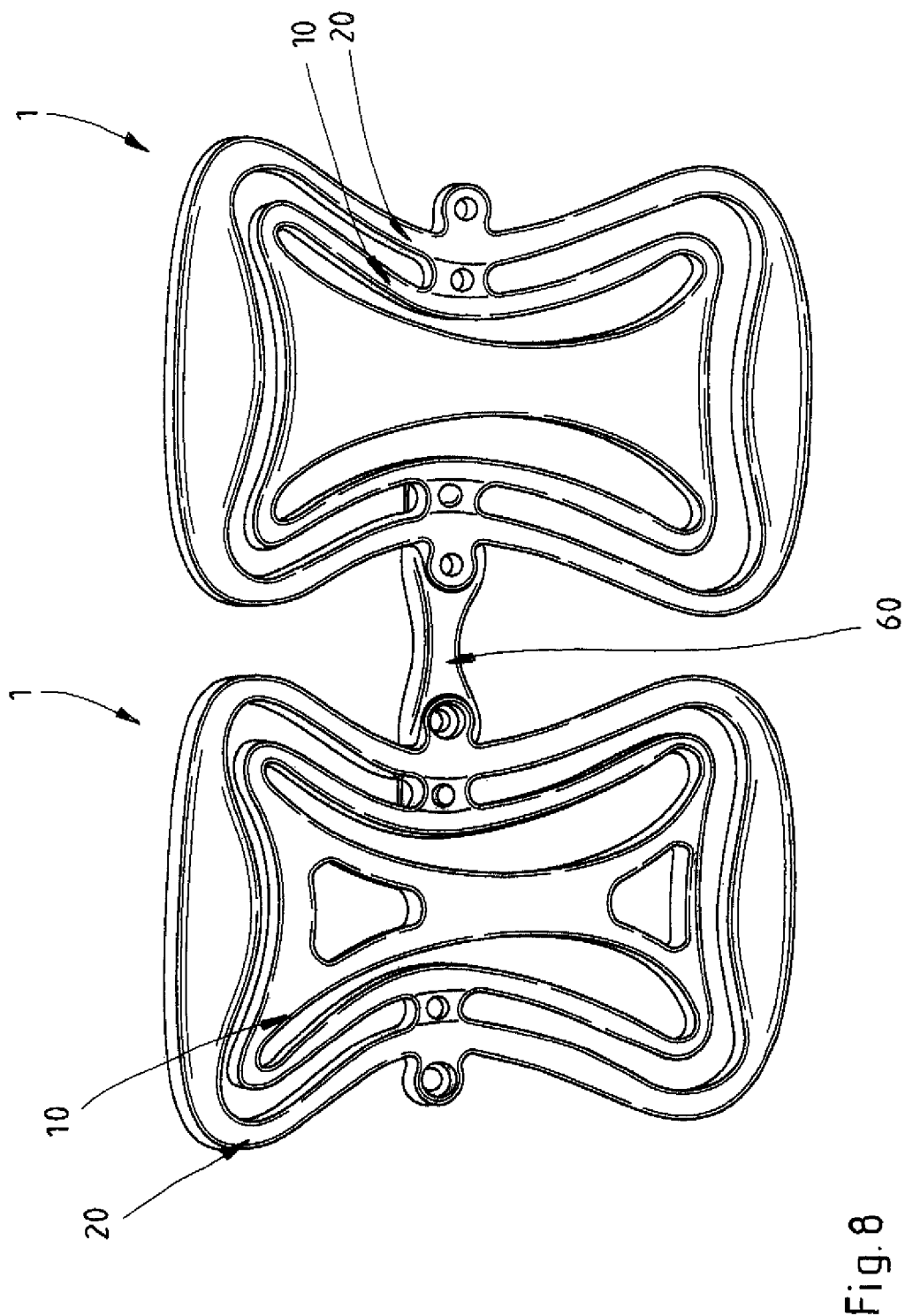
FIG. 8 is a schematic perspective view of a spring element according to the invention according to FIG. 4 as well as of a spring element according to the invention according to a third embodiment, coupled by means of a connecting device.
Figure 9:
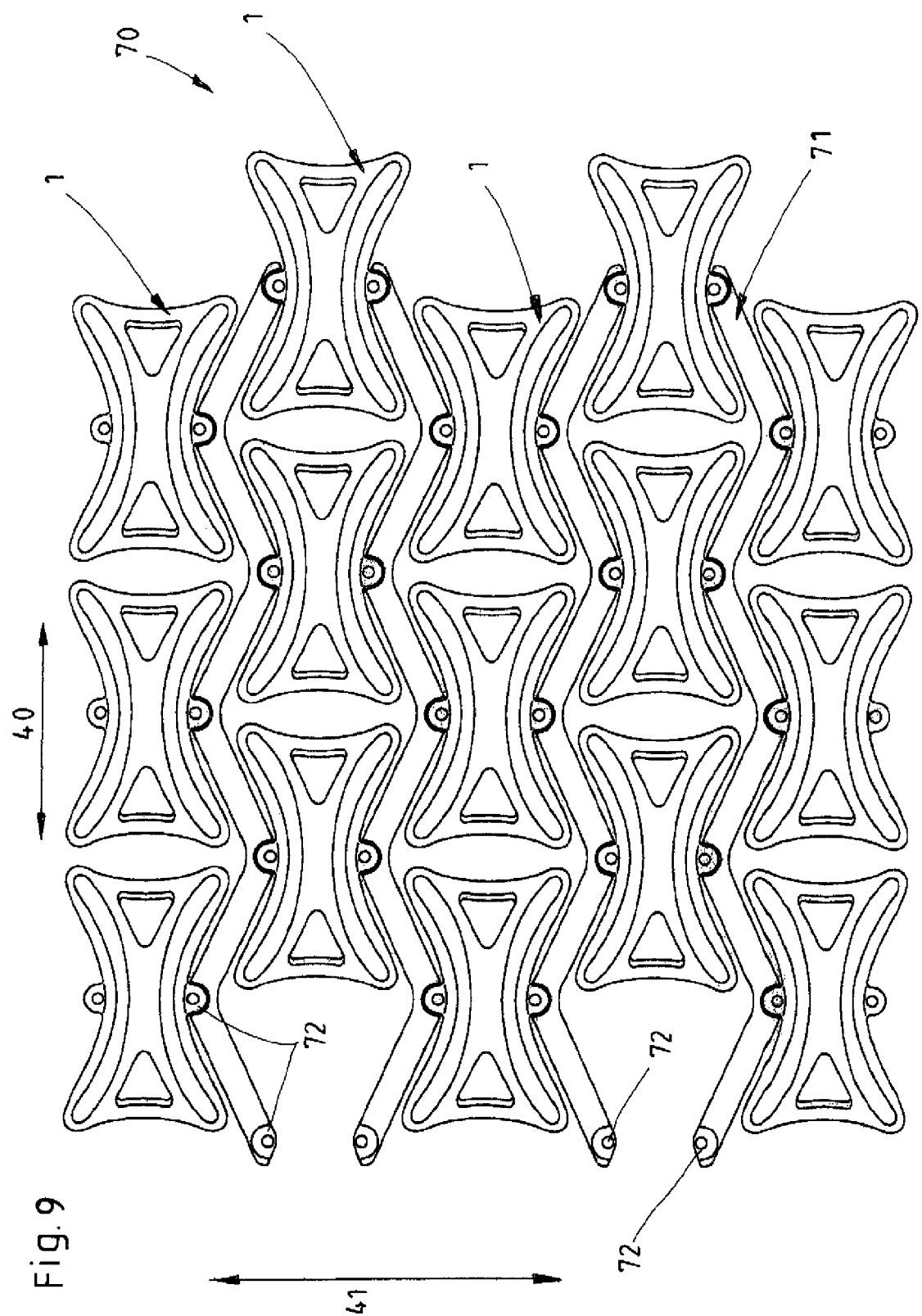
FIG. 9 is a schematic top view from above of a spring element mat.
Figure 18:
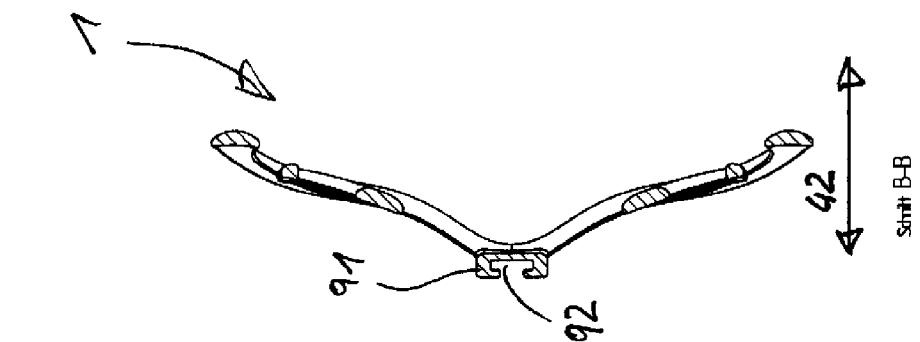
FIG. 18 is a partially cut side view of the spring element according to FIG. 16 along the cutting line B-B in FIG. 16.
Figure 17:
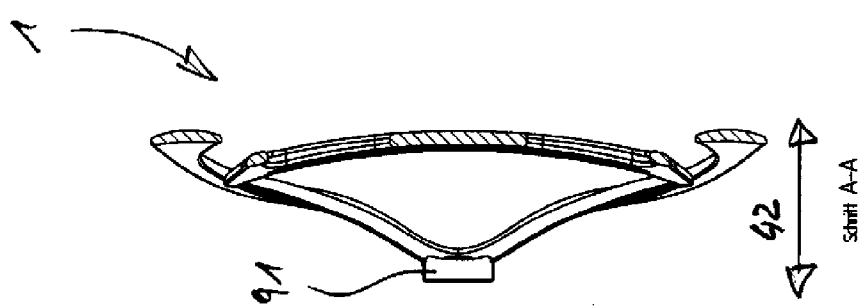
FIG. 17 is a partially cut side view of the spring element according to FIG. 16 along the cutting line A-A in FIG. 16.
Figure 16:
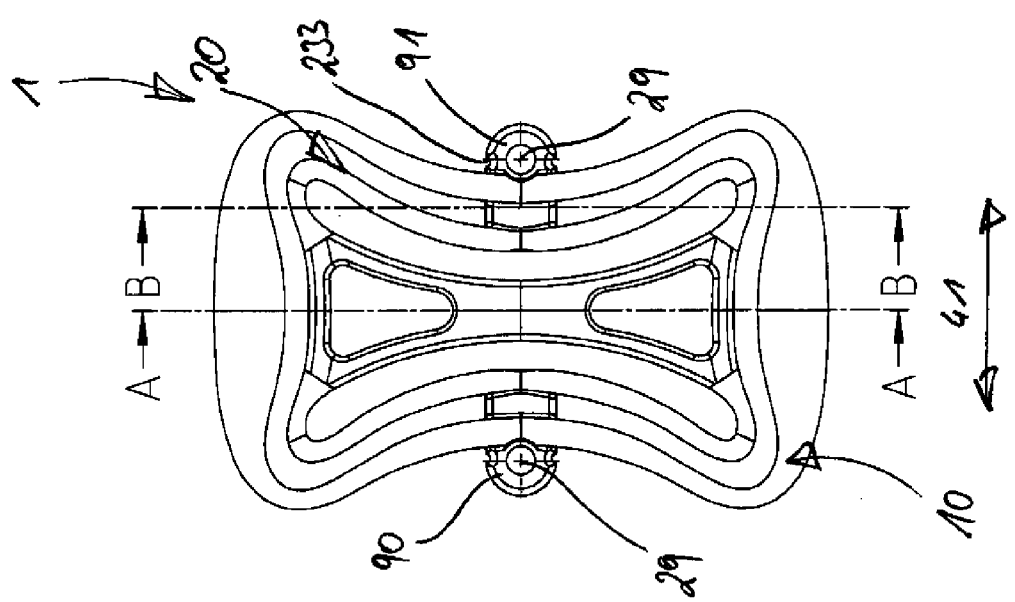
FIG. 16 is a top view from above of the spring element according to FIG. 15.

FIGS. 7 and 8 show the exemplary use of a connecting device 60 which serves to the preferably detachable connection of two spring elements 1. The connecting device 60 comprises a pin-shaped base body 61. This one respectively carries connecting sections 62 and 63 on the side of the one end and on the side of the other end, which connecting sections 62 and 63 are designed correspondingly to the connecting extensions 17 and 18 and/or the coupling elements 27 and 28 of the spring elements 1. Furthermore, the connecting sections 62 and 63 provide recesses 66, into which in particular the coupling elements 27 and 28 engage for the purpose of a torsion-proof placement of the spring elements 1 on the connecting device 60, as it is in particular visible in the representation of FIG. 7.

The connecting sections 62 and 63 of the connecting device 60 can furthermore comprise bores 64 and pins 65 which cooperate with correspondingly designed connecting extensions 17 and 18 or coupling elements 27 and 28 of the spring elements 1, as it is also in particular visible in the representation of FIG. 7.

Thanks to the connecting device 60, the spring elements can be ranged one after the other, in which case the connecting device 60 also serves as spacer between the spring elements 1, as it is in particular visible in the representation of FIG. 8, where also a "double" spring element having an accommodating section 30 comprising breakthroughs 31 is visible.

Two spring elements 1 of the type according to the invention can also be combined with each other in the height direction 42 for forming a spring module 80 which is exemplarily represented in FIG. 10. In such a case, the connecting extensions 17 and 18 or the coupling elements 27 and 28 are adjacent to each other with their respective rear sides facing each other, in which manner the spring module 80 is formed which comprises ring parts 11 or ring parts 21 that are directed upwards as well as downwards in the height direction 42. The connection area 81 formed between the two spring elements 1 according to FIG. 10 is only roughly represented schematically in the figure. Preferably, the connecting extensions 17 and 18 or the coupling elements 27 and 28 of the spring elements 1 are adjacent to each other on the rear sides, preferably with interposition of a connecting device 60. It goes furthermore without saying that the spring module 80 according to FIG. 10 only represents an exemplary design. Other spring elements 1 can also be combined with each other to form a spring module 80, for example such spring elements 1 as they are represented in FIGS. 1 through 3, i.e. such spring elements 1 which only comprise one ring part 11 and can thus be called "simple" spring elements 1.

Also spring modules of the above described type can be connected to each other by means of the connecting device 60, i.e. they will be ranged one after the other. Herein, the connecting device 60 does not only connect two spring modules to each other, but also connects the two spring elements 1 of a spring module.

A spring element 1 of the type according to the invention or a spring module composed of two spring elements 1 of the type according to the invention can be inserted in a is cushioning device, for example in form of a mattress made of foamed material. According to this embodiment, the cushioning device comprises a corresponding recess, the cross section contour of which is correspondingly adapted to a spring element 1 or a spring module composed of two spring elements 1. A spring element 1 or a spring module can be inserted in such a recess. Also several spring elements 1 or spring modules which have been ranged one after the other can be inserted in such a recess of a cushioning device.

In FIG. 9 a spring element mat 70 is visible. This one is formed by a plurality of spring elements 1 which are combined with each other by means of a connector 71. As it is visible in the representation of FIG. 9, a plurality of connectors 71 is used, which connectors are zigzag-shaped in the longitudinal direction 40. Herein, the particularity of the connectors 71 is that the spring elements 1 of one row, i.e. spring elements 1 which succeed each other in the longitudinal direction 40 are connected to each other, and also spring elements 1 of adjacent rows, i.e. spring elements 1 which are adjacent in the transverse direction 41 are connected to each other. In this way, an interwoven mat structure is created which permits to introduce impact forces in an optimized manner into the spring elements 1. Instead of a connector 71 extending in "zigzag" form, a linear connector 71 can also be used.

The connectors 71 are preferably designed as strip elements made of artificial material and provide connecting spots 72 which respectively comprise a bore or a pin which allows a coupling to a spring element 1. Herein, depending on the design of the spring element, either the connecting extensions 17 and 18 or the coupling elements 27 and 28 are used for a connection to the connector 71, wherein the connecting spots 72 of the connector 71 are designed correspondingly to the connecting extensions 17 and 18 or the coupling elements 27 and 28.

As it is furthermore visible in the representation of FIG. 9, the spring elements 1 of the spring element mat 70 are arranged offset with respect to each other by half a spring element 1 in rows. Thus, a compact structure having no skips is obtained. Only at the edge, i.e. to the left and right side with respect to the drawing plane, there is respectively one vacancy having the size of half a spring element 1 in every second row. But these vacancies cannot diminish the quality of resilience of the spring element mat 70, since they exclusively appear system dependent in the hardly, if at all loaded end zone. In the core zone of the spring element mat 70, the spring elements 1 rather engage into each other mutually "at vacancy", which allows a well distributed introduction of the forces into the spring element mat 70, such that the resilience comfort is clearly higher in comparison to spring element mats known from the state of the art.

Furthermore, the spring element mat 70 according to FIG. 9 can be designed in a very simple manner. Thus, the connectors 71 can be produced as an endless band. Depending on the later use, they can be individually cut into lengths and be equipped with a corresponding number of spring elements 1 at their connecting spots 72. The spring element mat 70 can be quasi endless in the transverse direction 41 and this by continuously coupling further connectors 71 or spring elements 70 to it. As a result, a spring element mat 70 can be advantageously designed which can be easily adapted to individual sizes.

It is furthermore within the scope of the invention to design the spring element mat 70 according to FIG. 9 with spring elements 1 which are different from those ones represented in FIG. 9. For forming the spring element mat 70, both "single" spring elements 1 and "double" spring elements 1 can be used, i.e. spring elements 1 which only comprise one ring part 11 or two ring parts 11 and 21. Furthermore, not only spring elements 1 but also spring modules 80 can be connected to each other by means of the connectors 71 in accordance with the representation in FIG. 10. Furthermore, a combination of spring elements 1 and/or spring modules 80 the design of which is different is also possible by means of the connectors 71. In so far the user has got a free choice.

FIGS. 11 through 18 show an alternative embodiment of a spring element 1 according to the invention, wherein FIGS. 11 through 14 show a first variant and FIGS. 15 through 18 show a second variant.

The spring element 1 according to FIGS. 11 through 14, on the one hand, or according to FIGS. 15 through 18, on the other hand, essentially corresponds to the embodiment according to FIGS. 4 through 6. The same elements are therefore referenced by the same reference numerals. The alternative embodiment is obtained because of the connecting sections 100 and 101 with respect to the first variant according to FIGS. 11 through 14 or because of the connecting sections 90 and 91 with respect to the second variant according to FIGS. 15 through 18.

According to the embodiment of FIGS. 4 through 6, the spring element 1 carries coupling elements 27 and 28 on the outer side of the ring, which coupling elements respectively comprise a bore 29. In contrast to this, the spring element 1 according to FIGS. 11 through 18 does not comprise any coupling elements 27 or 28, but comprises first and second connecting sections 90 and 91 or 100 and 101.

Figure 26:
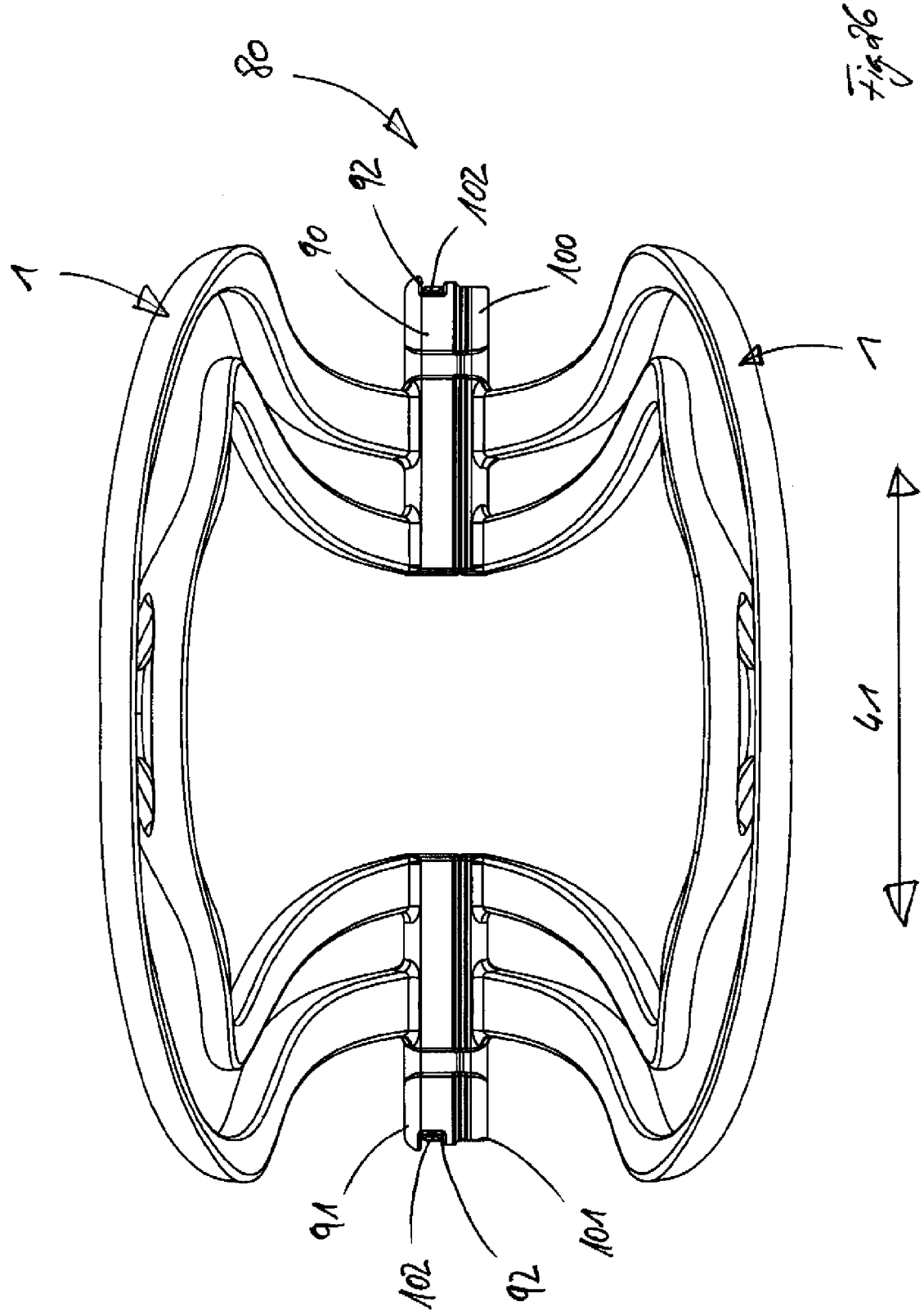
FIG. 26 is a side view of a spring module composed of two combined spring elements according to the FIGS. 11 and 15.
Figure 27:
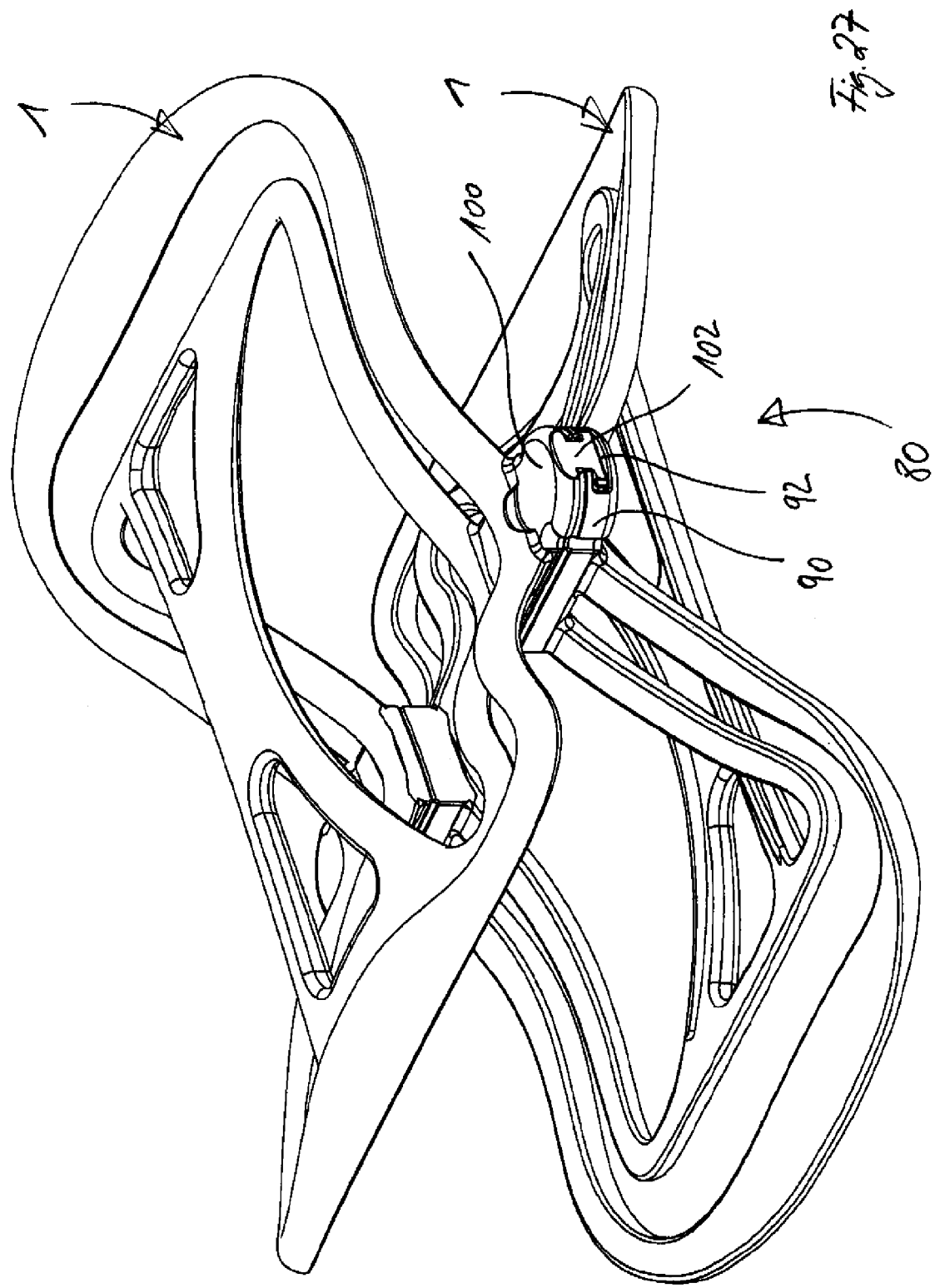
FIG. 27 is a schematic perspective view of the spring module according to FIG. 26.

The connecting sections 100 or 101 according to the first variant of the FIGS. 11 through 14 respectively provide a T-shaped connecting piece 102. The connecting sections 90 or 91 according to the second variant of the FIGS. 15 through 18 however respectively provide a T-shaped groove 92. Herein, the T-shaped groove 92 and T-shaped connecting piece are designed correspondingly to each other, which fact allows combining a spring element 1 according to the first variant of the FIGS. 11 through 14 with a spring element 1 according to the second variant of the FIGS. 15 through 18 for forming a spring module 80, as it is represented in FIGS. 26 and 27.

The advantage of the T-shaped design of the groove 92, on the one hand, and of the connecting piece 102, on the other hand, is that a position safe and position precise connection between two spring elements 1 for forming a spring module 80 is assured. For the purpose of assembly, the connecting sections 100 and 101 of a male spring element 1, such as for example shown in FIG. 11, have to be resiliently retracted in the transverse direction 41, i.e. the connecting sections 100 and 101 have to be moved towards each other in the transverse direction 41. In this resiliently retracted state, the spring element 1 can be inserted into a female spring element, as it is represented in FIG. 15, such that the connecting pieces 102 which are carried by the connecting sections 100 and 101 join the grooves 92 of the connecting sections 90 and 91 from inside. In this joined position, the male spring element 1 can spring upwards again, such that consequently the connecting sections 100 and 101 spring again away from each other in the transverse direction 41, such that consequently the connecting pieces 102 carried by them are brought into the due end position with respect to the grooves 92 of the connecting sections 90 and 91 of the other spring element. In the finally assembled state, the spring elements 1 form a flush edge at the ends, as it is in particular visible in the side view of FIG. 26.

The male spring elements 1 according to FIGS. 11 through 14 preferably comprise snap-in recesses 232 with respect to the connecting sections 100 and 101. The connecting sections 90 and 91 of the female spring elements according to FIGS. 15 through 18 comprise snap-in noses 233 which are designed correspondingly to these snap-in recesses 232. In the finally assembled state, the snap-in noses 233 of the female spring elements 1 engage into the snap-in recesses 232 of the male spring elements 1, such that an undesired detachment of the spring elements 1 in the transverse direction 41 is not possible. An unintended detachment of both spring elements 1 in the height direction 42 is prevented by the T-shaped connection of the grooves 92, on the one hand, and of the connecting pieces 102, on the other hand, such that altogether a position safe and position fixed connection of the two spring elements 1 is assured.

For connecting two female spring elements according to FIGS. 15 through 18, connecting device 60 is provided such as it is represented in FIGS. 19 through 22.

A connecting device 60 which connects two spring elements 1 to each other comprises a base body 61 which is joined by two connecting sections 62 and 63, as it is in particular visible in the representation of FIG. 20. Herein, the base body 61 provides a sector-shaped inner contour 234 on each side of a connecting section, which inner contour is designed correspondingly to the end side design of the connecting sections 90 and 91 of the spring element 1.

For the purpose of the snapped-in connection between the connecting device 60 and two spring elements 1, the connecting sections 62 and 63 of the connecting device 60 respectively carry one snap-in extension 235. In the finally assembled state, this snap-in extension 235 engages in a corresponding bore 29 of the spring elements 1.

Figure 23:
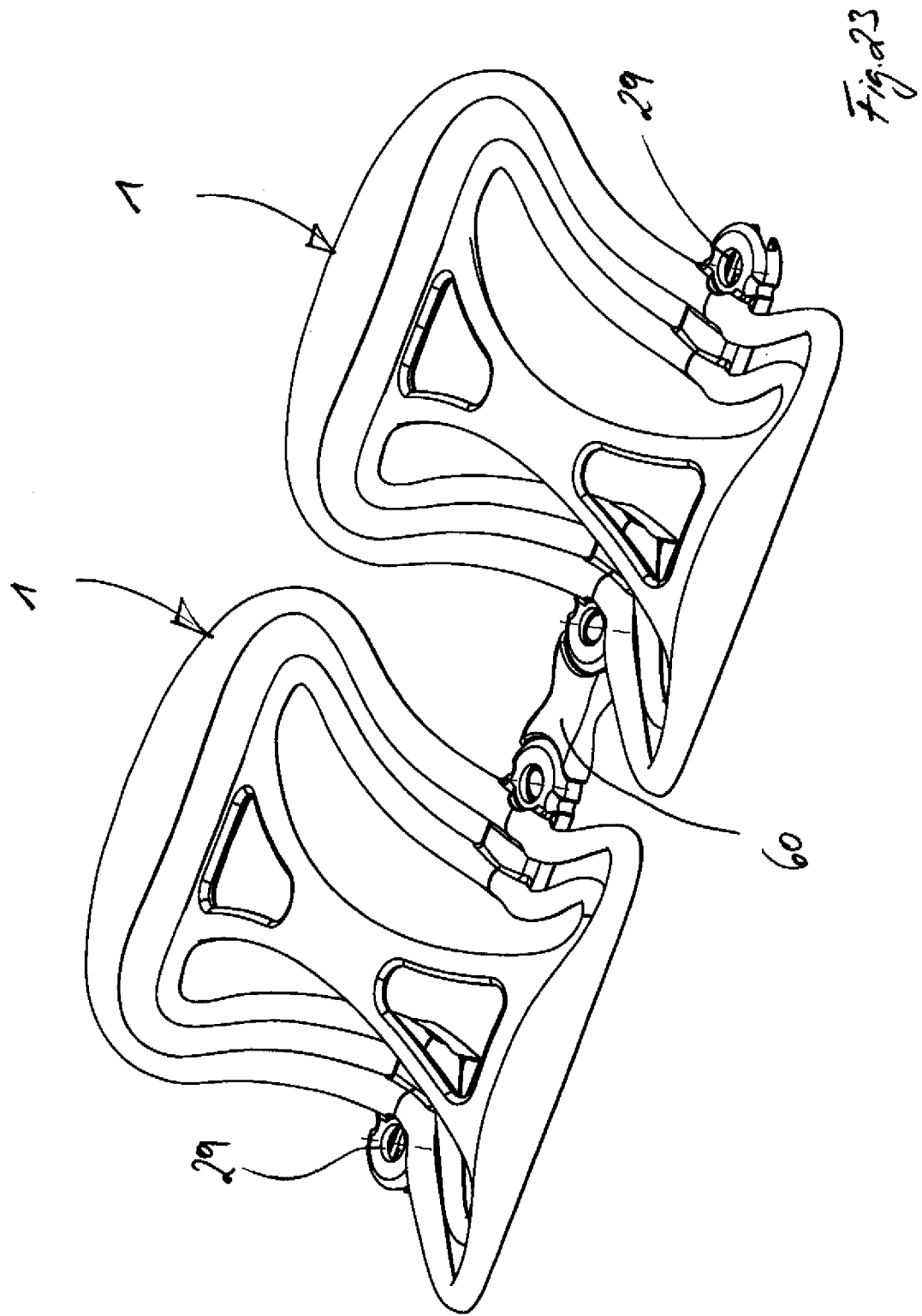
FIG. 23 is a schematic perspective view of two spring elements according to FIG. 15 which have been combined with each other by means of a connecting device according to FIG. 19.
Figure 24:
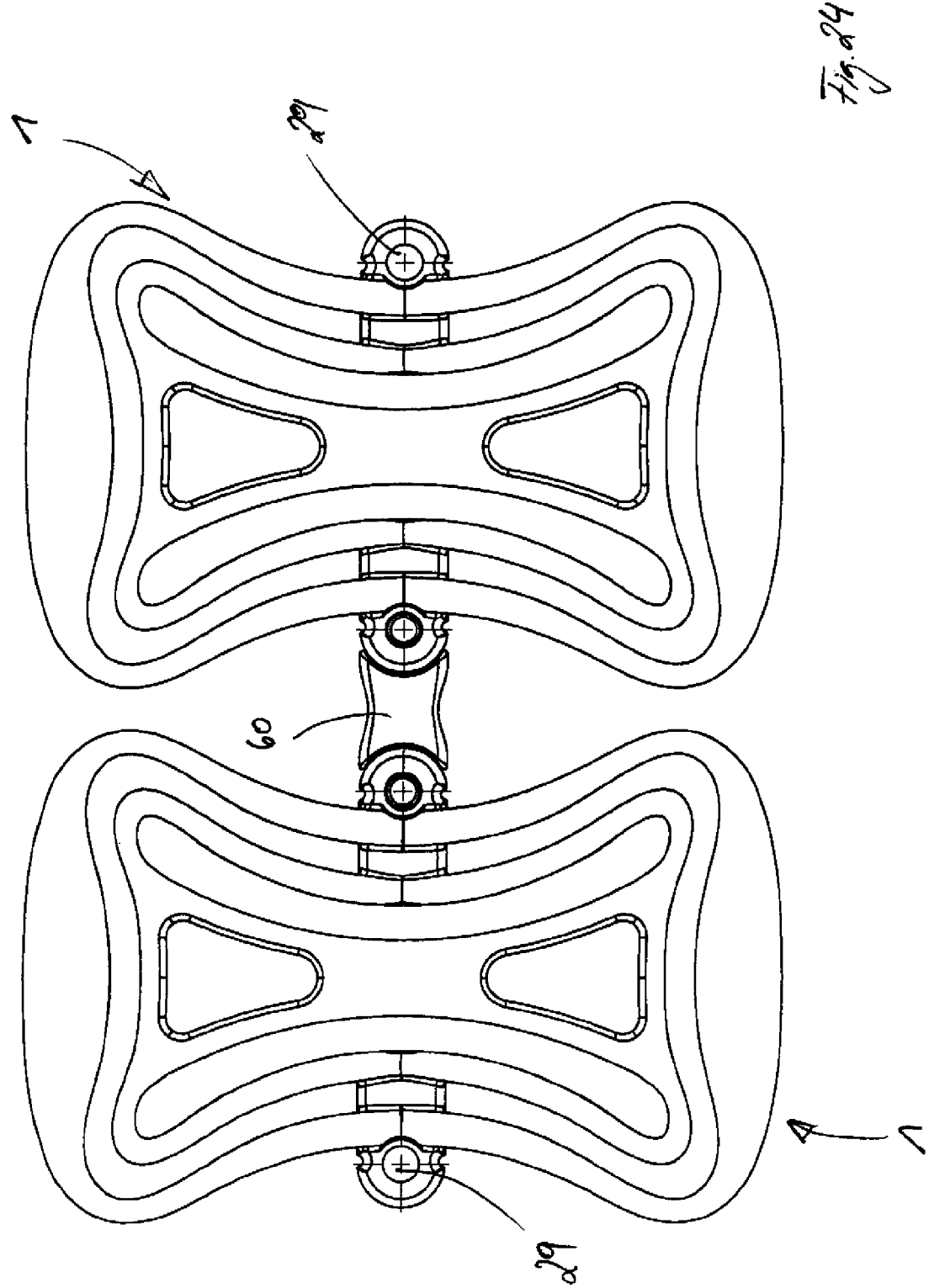
FIG. 24 is a top view from above of the spring elements and the connecting device according to FIG. 23.
Figure 25:
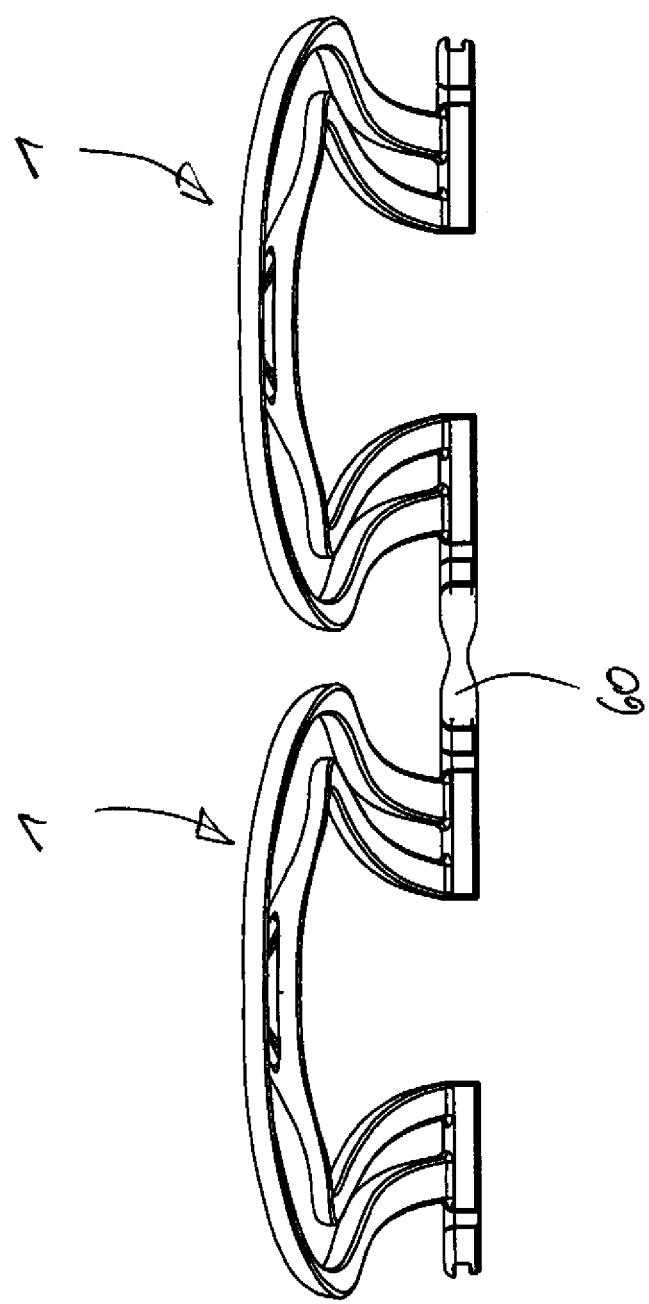
FIG. 25 is a side view of the spring elements and the connecting device according to FIG. 23.

In FIGS. 23, 24 and 25 two spring elements 1 which have been combined with each other by means of a connecting device 60 are visible in different views.

As it is in particular visible in the representations of FIGS. 21 and 22, the snap-in extensions 235 provide an inclined end surface 236. Thanks to this inclination, a simplified insertion of the respective connecting section 62 or 63 into the associated T-shaped groove 92 of the spring element 1 is realized.

Another connecting device 60 is visible in FIGS. 28 through 31. This connecting device 60 serves to couple two spring elements 80 to each other, as they are represented in FIGS. 26 and 27. Two spring modules 80 which are coupled to each other in this way are visible in FIG. 32.

As it is visible in FIGS. 28 through 31, the connecting device 60 for coupling two spring modules 80 to each other comprises a base body 61 which provides two hollow spaces 237. Herein, a respective hollow space 237 serves to receive the connecting sections 90 and 100 or 91 and 101 connected to each other of two spring elements 1 which have been combined with each other for forming a spring module 80. For the purpose of a safe placement, the hollow spaces 237 provide snap-in noses in form of snap-in webs 238 which engage into associated snap-in recesses of the spring module 80 in the finally assembled state.

FIG. 33 is a schematic perspective view of the spring system 200 according to the invention. The spring system 200 comprises a plurality of spring elements 1, on the one hand, and a plurality of connecting rails 201, on the other hand. Herein, each connecting rail 201 is equipped with a plurality of spring elements 1.

The spring system 200 which is only exemplarily and schematically represented in FIG. 33 comprises fifteen spring elements 1 and three connecting rails 201 in total, wherein five spring elements 1 are provided for each connecting rail 201, which spring elements 1 are placed side by side in a spaced manner with respect to the longitudinal direction 223 of the connecting rails 201.

The spring system 200 which is exemplarily represented in the figures serves to the bottom springing of a bed mattress which is not further represented in the figures. In the finally assembled state, it is received by a frame 212, for example a bed frame, as the representation according to FIG. 37 shows. According to this exemplary embodiment, a frame 212 is provided which comprises an outer frame 213 and an inner frame 214. The inner frame can be susceptible to be at least partially pivoted with respect to the outer frame 213.

The inner frame 214 receives the spring system 200 according to the invention, wherein depending on the connecting rail 201 of the spring system 200, two supports 204 are provided which rest upon a respectively associated longitudinal sleeper 215 of the inner frame 214. As it is visible in the representation of FIG. 37, such a support 204 is provided both at the one end and at the other end of each connecting rail 201 of the spring system 200.

If the FIGS. 33, 34 and 36 are seen together, it becomes in particular apparent that each support 204 carries a base 203 in the finally assembled state. This base 203 can be placed on the support 204 in a displaceable manner in the height direction 42, in order to be able to carry out an individual height adaptation. Each base 203 supports the connecting rail 201 at the end, and this with interposition of a spring part 202. In this way, a spring resilient arrangement of the connecting rail 201 on the frame 212 is assured.

For placing a spring part 202 on a connecting rail 201, the connecting rail 201 comprises slots 208 which extend in the longitudinal direction on its bottom side with respect to the drawing plane according to FIGS. 36 and 40. In the finally assembled state, the spring part 202 engages with profiled sections 209 into these slots 208, whereby a safe hold of the connecting rail 201 with respect to the spring part 202 is obtained.

In order to prevent an undesired detachment of the spring part 202 from the slots 208 provided by the connecting rail 201, end caps 207 can be provided, by means of which the slots 208 are closed in the finally assembled state, as it is for example visible in the representation of FIG. 33.

For attaching the spring part 202 to the base 203, a foot 210 is provided on the spring part, which foot engages in a correspondingly designed receiver 211 of the base 203 in the finally assembled state. The receiver 211 can be for example a T-shaped groove. In this case, the foot 210 comprises an also T-shaped counter-contour.

FIG. 34 is a view from below of the above described embodiment. As it is visible in this representation, the spring parts 202 can be freely positioned on the connecting rail 201 in their relative position in the longitudinal direction 223. The slots 208 of the connecting rail 201 which receive the profiled sections 209 of the spring parts 202 are continuously formed in the longitudinal direction 223. In contrast to the state of the art, this design enables to use connecting rails 201 which are greater with respect to their longitudinal extension 223 than the clearance between the respective longitudinal sleepers, which clearance is provided by the frame 212. This fact becomes in particular apparent from the representation in FIG. 37, in which it is visible that the connecting rail 201 extends above the frame 212 with respect to the drawing plane of FIG. 37 and comprises an extension in the longitudinal direction 223 which corresponds to the width of the outer frame. Advantageously, the spring elements 1 which are carried by a connecting rail 201 on the left side and on the right side with respect to the drawing plane of FIG. 37 can be positioned directly above the frame 212. If two frames 212 are used, as this is typically the case of a double bed, a clearance 216 between the respective spring elements at the ends of the spring systems 200 carried by the adjacent frames is obtained which is smaller than the one according to the state of the art, as this is visible in FIG. 38. The clearance 216 between spring elements 1 of adjacent spring systems 200 is not greater than the distance between adjacent spring elements 1 of one and the same spring system 200, whereby a uniform and continuous total lying area, i.e. receiving area of a bed mattress will be provided.

The connecting rail 201 comprises a T-shaped groove 206 which extends in the longitudinal direction 223 for arranging spring elements 1 on the connecting rail 201, as this is in particular visible in the representation of FIG. 40. This groove 206 serves to the connection of the connecting rail 201 to the spring elements 1.

Such a spring element 1 is represented in different views in FIGS. 11 through 14.

For attaching a spring element 1 to a connecting rail 201, the spring element 1 has to be introduced with its connecting pieces that are respectively carried by the connecting is sections 100 and 101 into the T-shaped groove 206 of the connecting rail 201. Herein, the spring element 1 can be freely positioned in the longitudinal direction 223, i.e. in the direction of the T-shaped groove 206, in its relative position with respect to the connecting rail 201.

According to a special advantage of the invention, spacers 224 can be provided between two adjacent spring elements 1 of a connecting rail 201. Such a spacer 224 is exemplarily represented in FIG. 41. This spacer comprises a base body 225 as well as a spreading section 226. In the finally assembled state, the spreading section 226 of the spacer 224 engages into the T-shaped groove 206 of the connecting rail 201, as it is represented in FIG. 9.

Instead of a spacer 224 also a cover 227 which covers the top side of the connecting rail 201 can be used for spacing two spring elements 1 the cover being represented in a schematic front view in FIG. 42. On the side of the rail, the cover 227 also comprises a spreading section 226 which engages in the way of an anchor into the T-shaped groove 206 of the connecting rail 201 in the finally assembled state. On the top side with respect to the drawing plane of FIG. 42, the cover 227 can provide an especially designed décor which improves the total visual impression of such an equipped connecting rail 201.

According to another feature of the invention, an adapter 205 is provided, the adapter being represented in FIG. 39. It serves to be interposed between a spring element 1 and a connecting rail 201, wherein it is allowed to arrange the spring element 1 in a position turned by 90° with respect to the connecting rail 201 as it is in particular visible in the representation of FIG. 35. Without interposition of an adapter 205, the longitudinal direction 40 of a spring element 1 is transverse to the longitudinal direction 223 of a connecting rail 201. If an adapter 205 is interposed, the longitudinal direction 40 of a spring element 1 and the longitudinal direction 223 of a connecting rail 201 coincide. The arrangement of a spring element 1 in a position turned by 90°, which is possible thanks to an adapter 205, allows creating an 'interlocked' supporting surface of a bed mattress, whereby the altogether provided springing comfort is improved.

As it is visible in FIG. 39, the adapter 205 has got a base 218. This base 218 carries a T-shaped coupling element 217 on the bottom side with respect to the drawing plane of FIG. 39. This coupling element is designed correspondingly to the T-shaped groove 206 of the connecting rail 201.

On the left side well as on the right side of the base 218 with respect to the drawing plane of FIG. 39, wings 219 or 220 are added. These wings 210 and 220 serve to connect the adapter 205 to a spring element 1. For this purpose, the wings 219 and 220 respectively provide a T-shaped groove 222 which is designed correspondingly to the T-shaped connecting pieces 102 of the connecting sections 100 and 101 of the spring element 1.

Furthermore, the inner contour 221 provided by the wings 219 and 220 is adapted to the crowned outer contour of the connecting rails 201, such that it is assured that the adapter 205 is adjacent without any gap to a connecting rail 201 in the finally assembled state, as it is also visible in the representation of FIG. 33.

The connecting rail 201 shown in the FIGS. 33 through 40 is a self-supporting rail, i.e. a connecting rail 201 which does not need any further support by a carrying support. In the due application case, it receives the appearing impact forces and transmits them for example into a frame 212.

Figure 44:
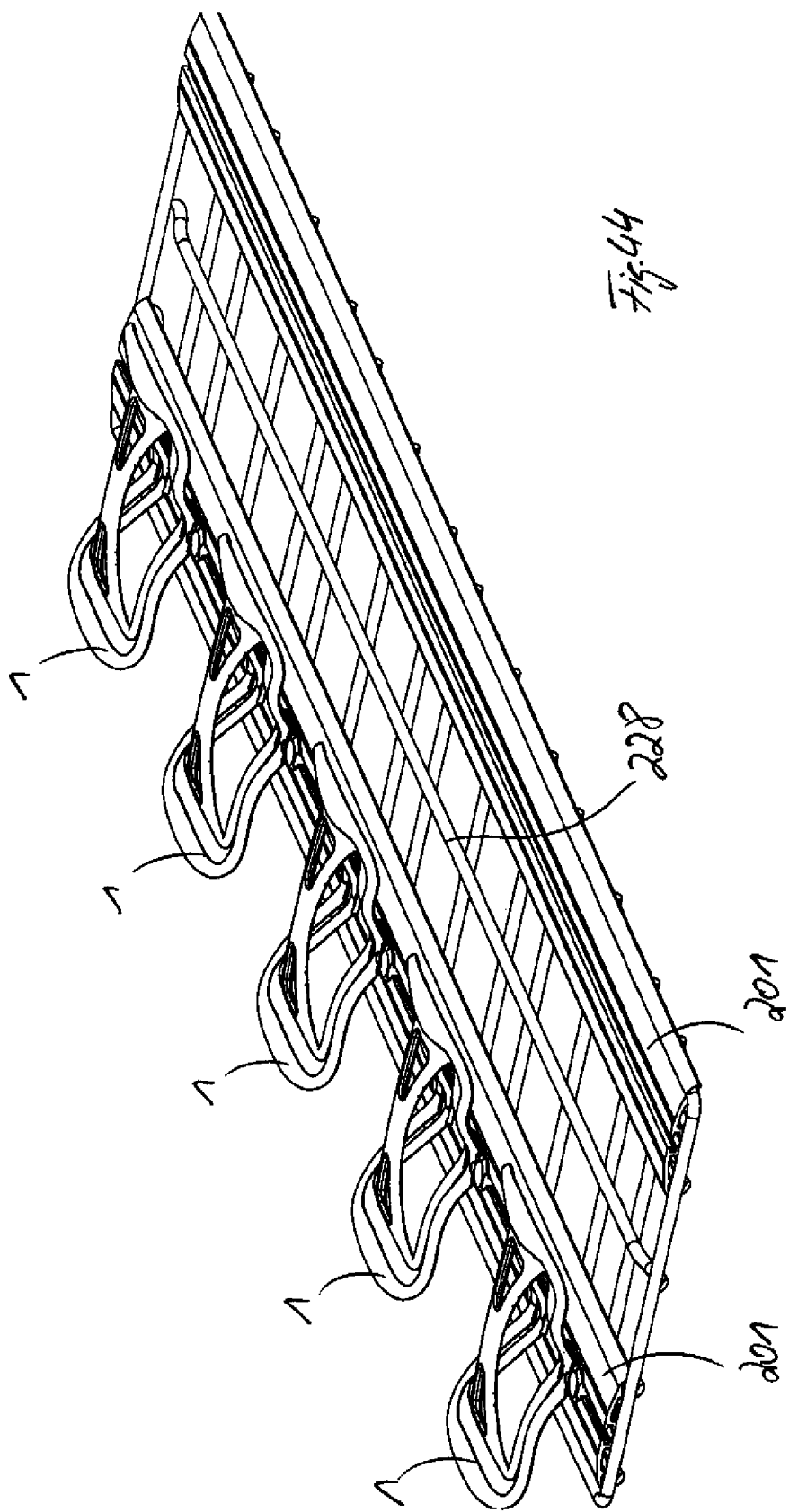
FIG. 44 is a schematic perspective view of a modification of the second embodiment of a connecting rail according to the invention.

According to an alternative embodiment of the invention, it can be provided that the connecting rail 201 is not self-supporting. Therefore, a carrying support 228 is required in the finally assembled state for absorbing duly appearing forces. This alternative embodiment is represented in FIGS. 43 and 44, wherein FIG. 11 shows a first variant and FIG. 12 shows a second variant.

FIG. 43 shows a variant according to which a connecting rail 201 is laid on a slat, for example a slat of a slatted frame, serving as carrying support 228. In this case, the carrying support assumes the carrying function, wherein the connecting rail 201 has the task to connect the spring elements 1 to the carrying support 228. This variant is in particular suitable in case of a post-equipment, i.e. for equipping a slatted frame known from the state of the art with spring elements 1. Herein, a respective connecting rail 201 has to be allocated to each slat as carrying support 228, as it results from the is representation of FIG. 43. FIG. 44 shows an alternative. According to this one, a netted grid-like structure is used as carrying support 228. In contrast to the variant according to FIG. 43, the carrying support 228 according to FIG. 44 carries not only one but several connecting rails 201, in the shown exemplary embodiment two of such connecting rails 201.

An alternative embodiment of the connecting rail 201 is shown in FIG. 45.

According to this alternative, the connecting rail 201 comprises sections 229 which are angled with respect to each other in the longitudinal direction 223. Thanks to this angled design, a "zigzag"-shaped contour of the connecting rail 201 is obtained.

For connecting the connecting rail 201 to spring elements 1, the connecting rail 201 comprises connecting pieces 230. These ones are respectively formed in a connection area of two sections 229 and extend transversely to the longitudinal direction 223. The cross section of the connecting pieces 230 is T-shaped and they cooperate with connecting sections 90 and 91 of the spring elements 1 which respectively comprise a T-shaped groove 92, which fact results in particular from FIGS. 15 through 18 with respect to the spring elements 1.

A bracket 231 is formed at one end of each connecting rail 201. In the finally assembled state, this bracket engages in a correspondingly designed pocket which is formed at the other end of an adjacent connecting rail 201. In this manner, a plurality of connecting rails 201 can be combined with each other to form an "endless rail".

The spring element 1 which can be combined with the connecting rail 201 according to FIG. 45 is represented in the FIGS. 15 through 18. This spring element 1 essentially corresponds to the already above described spring element 1 according to the FIGS. 11 through 14. In contrast to the above explained spring element 1, the spring element 1 according to the FIGS. 15 through 18 however comprises different connecting sections, namely the connecting sections 90 and 91. These ones do not provide a connecting piece but a T-shaped groove 92. In so far, the spring element 1 represented in the FIGS. 15 trough 18 is suitable for being coupled to a connecting rail 201 according to FIG. 45 and the spring element 1 according to FIGS. 11 through 14 is suitable for being coupled to a connecting rail 201 according to for example FIG. 33.

FIGS. 46 and 47 finally show the embodiment of the connecting rail 201 according to FIG. 45 in more detail, in a plan view from below according to FIG. 46 and in a top view from above according to FIG. 47. Herein, the T-shaped design of the connecting pieces 230 is in particular visible in the representation of FIG. 46.

As it is furthermore visible in FIGS. 46 and 47, the brackets 231 comprise sector-shaped snap-in recesses for connecting two connecting rails 201, which snap-in recesses engage in correspondingly designed snap-in noses of the connecting pocket of the other connecting rail 201 in the finally assembled state.

In the shown exemplary embodiment, the sections 229 of a connecting rail 201 respectively include an angle of about 136 degrees.

LIST OF REFERENCE NUMERALS

1 spring element
10 spring body
11 ring part
12 center section
13 first ring part section
14 second ring part section
15 first end area
16 second end area
17 first connecting extension
18 second connecting extension 19 bore
20 second spring body
21 ring part
22 center section
23 first ring part section
24 second ring part section
25 first end area
26 second end area
27 first coupling element
28 second coupling element
29 pin/bore
30 accommodating section
31 breakthrough
40 longitudinal direction
41 transverse direction
42 height direction
50 thickening
60 connecting device
61 base body
62 first connecting section
63 second connecting section
64 bore
65 web
66 recess
70 spring element mat
71 connector
72 connecting spots
80 spring module
81 connecting area
90 first connecting section
91 second connecting section
92 T-shaped groove
100 first connecting section
101 second connecting section
102 T-shaped connecting piece
200 spring system
201 connecting rail
202 spring part
203 base
204 support
205 adapter
206 T-shaped groove
207 end cap
208 slot
209 profiled section
210 foot
211 receiver
212 frame
213 outer frame
214 inner frame
215 longitudinal sleeper
216 clearance
217 T-shaped coupling element
218 base
219 wing
220 wing
221 inner contour
222 T-shaped groove
223 longitudinal direction
224 spacer
225 base body
226 spreading section
227 cover
228 carrying support
229 section
230 connecting piece
231 bracket
232 snap-in recess
233 snap-in nose
234 inner contour
235 snap-in extension
236 end surface
237 hollow space
238 snap-in web

What is claimed is:

1. A spring element for a cushioning device of a piece of furniture for sitting or lying, comprising a spring body (10) and an accommodating section (30) arranged thereon, wherein the spring body (10) and the accommodating section (30) are injection-molded from plastic as one piece, wherein the spring body (10) comprises a ring part (11) having a longitudinal direction (40) and a transverse direction perpendicular to the longitudinal direction, wherein the ring part is comprised of a first ring part section, a second ring part section (13, 14) and a center section (12), wherein the center section is located between the first and second ring part sections in the longitudinal direction and connects the first and second ring part sections to each other, wherein the first and second ring part sections each comprise an end area (15, 16) arranged opposite the center section in the longitudinal direction and extending in the transverse direction, wherein the first and second ring part sections each form two spring arms connecting the center section and the end area, respectively, wherein the two spring arms of the first and second ring part sections each have an upward slope in a height direction (42) of the ring part, wherein the height direction (42) extends perpendicular to the longitudinal direction and to the transverse direction, the upward slope extending from the center section (12) to the end areas, respectively, wherein the accommodating section (30) extends in the longitudinal direction and has opposed ends connected to the end areas (15, 16) of the ring part sections (13, 14), wherein the accommodating section (30) is positioned between the two spring arms of the first and second ring part sections (13, 14), respectively, and is crowned in the height direction (42) away from the center section (12).

2. A spring element according to claim 1, characterized in that the ring part (11) is tapered in the area of the center section (12).

3. A spring element according to claim 1, characterized in that the accommodating section (30) is a tapered strip element.

4. A spring element according to claim 3, characterized in that the tapered strip element is crowned with respect to its longitudinal extension (40).

5. A spring element according to claim 1, characterized in that the center section (12) carries two connecting extensions (6, 17) on the outer side of the ring part, which are placed opposite each other in the transverse direction (41) of the ring part (11) and form one piece with the ring part (11).

6. A spring element according to claim 1, characterized by a second spring body (20) which is a ring part (21) extended in the longitudinal direction (40), which ring part comprises two ring part sections (23, 24) which transition into each other as one piece in a center section (22) and which respectively have an upward slope in the height direction (42) starting from the center section (22).

7. A spring element according to claim 6, characterized in that the ring part (21) of the second spring body (20) encompasses the ring part (11) of the first spring body (10).

8. A spring element according to claim 6, characterized in that the two spring bodies (10, 20) are one piece, wherein the spring bodies (10, 20) are connected to each other, the connecting extensions (17, 18) of the first spring body (10) being interposed.

9. A spring element according to claim 1, characterized in that on the outer side of the ring part, the center section (22) of the second spring body (20) carries two coupling elements (27, 28) or connecting sections (90, 91; 100, 101) which are lying opposite each other in the transverse direction (41) of the ring part (21) and which are made in one piece with the ring part (21).

10. A spring element according to claim 9, characterized in that the connecting sections (90, 91; 100, 101) respectively provide either a T-shaped groove (92) or a T-shaped connecting piece (102).

11. A connecting device for the detachable connection of two spring elements (1) according to claim 1, comprising a pin-shaped base body (61) which respectively carries connecting sections (62, 63) on the side of the one end and on the side of the other end, which connecting sections are formed correspondingly to the connecting extensions (17, 18), the coupling elements (27, 28) and/or the connecting sections (90, 91; 100, 101) of the spring elements (1).

\* \* \* \* \*